(12) United States Patent
Oyagi et al.

(10) Patent No.: US 10,208,701 B2
(45) Date of Patent: Feb. 19, 2019

(54) ENGINE CONTROL APPARATUS FOR EXECUTING BARYCENTRIC POSITION CONTROL AND SPECIFIC CONTROL

(71) Applicant: TOYOTA JIDOSHA KABUSHIKI KAISHA, Toyota-shi, Aichi (JP)

(72) Inventors: Hiroshi Oyagi, Gotenba (JP); Akira Yamashita, Sunto-gun (JP); Kazuyasu Iwata, Fuji (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 123 days.

(21) Appl. No.: 15/103,071

(22) PCT Filed: Dec. 9, 2014

(86) PCT No.: PCT/JP2014/083065
§ 371 (c)(1),
(2) Date: Jun. 9, 2016

(87) PCT Pub. No.: WO2015/088035
PCT Pub. Date: Jun. 18, 2015

(65) Prior Publication Data
US 2016/0377020 A1    Dec. 29, 2016

(30) Foreign Application Priority Data

Dec. 12, 2013 (JP) ................................ 2013-257328

(51) Int. Cl.
| F02M 35/02 | (2006.01) |
| F02D 41/40 | (2006.01) |
| F02D 35/02 | (2006.01) |
| F02D 41/00 | (2006.01) |
| F02M 26/02 | (2016.01) |
| F02D 41/26 | (2006.01) |

(52) U.S. Cl.
CPC ......... F02D 41/403 (2013.01); F02D 35/023 (2013.01); F02D 35/028 (2013.01);
(Continued)

(58) Field of Classification Search
CPC ...... F02D 41/403; F02D 41/26; F02D 41/401; F02D 41/005; F02D 41/0007;
(Continued)

(56) References Cited

U.S. PATENT DOCUMENTS 5,698,776 A     12/1997  Tomisawa
8,191,532 B2 *   6/2012  Folkerts et al. ......... 123/406.11
(Continued)

FOREIGN PATENT DOCUMENTS

EP     1 496 235 A2    1/2005
EP     2 123 887 A1    11/2009
(Continued)

*Primary Examiner* — David Hamaoui
(74) *Attorney, Agent, or Firm* — Finnegan, Henderson, Farabow, Garrett & Dunner, LLP

(57) ABSTRACT

A control apparatus is provided, which controls combustion state such that the Heat Release Rate Barycentric Position (Gc) coincides with the Target Barycentric Position (Gc*), and which can prevent an increase in the combustion noise caused by an increase in an ignition lag which occurs in a case where an EGR apparatus is in execution, and, a rotational speed is low or an engine load is low. The control apparatus (ECU70) prevents the increase in the ignition lag by increasing a supercharging pressure of a supercharger (44) which the engine (10) is equipped with, thus, it prevents the increase in the combustion noise.

6 Claims, 19 Drawing Sheets

(52) U.S. Cl.
CPC ....... *F02D 41/005* (2013.01); *F02D 41/0007* (2013.01); *F02D 41/26* (2013.01); *F02D 41/401* (2013.01); *F02M 26/02* (2016.02); *Y02T 10/144* (2013.01); *Y02T 10/44* (2013.01); *Y02T 10/47* (2013.01)

(58) Field of Classification Search
CPC ..... F02D 35/028; F02D 35/023; F02M 26/02; Y02T 10/44; Y02T 10/144; Y02T 10/47
See application file for complete search history.

(56) References Cited

U.S. PATENT DOCUMENTS

| | | | |
|---|---|---|---|
| 8,340,887 B2 * | 12/2012 | Yamaguchi et al. | 701/104 |
| 9,657,681 B2 * | 5/2017 | Iwata et al. | |
| 9,951,697 B2 * | 4/2018 | Imaeda | |
| 2012/0046850 A1 | 2/2012 | Yasuda et al. | |
| 2016/0115888 A1 * | 4/2016 | Nada | 701/104 |

FOREIGN PATENT DOCUMENTS

| | | |
|---|---|---|
| EP | 2 541 030 A1 | 1/2013 |
| JP | 60-50255 | 3/1985 |
| JP | 8-232820 | 9/1996 |
| JP | 2001-227381 | 8/2001 |
| JP | 2003-138970 | 5/2003 |
| JP | 2011-202629 | 10/2011 |
| RU | 2 432 479 C2 | 5/2011 |
| WO | WO2008/032190 A1 | 3/2008 |
| WO | WO 2008/125949 A1 | 10/2008 |
| WO | WO 2014/196034 A1 | 12/2014 |

* cited by examiner

FIG. 1
(A) Heat Release Rate Barycentric Position
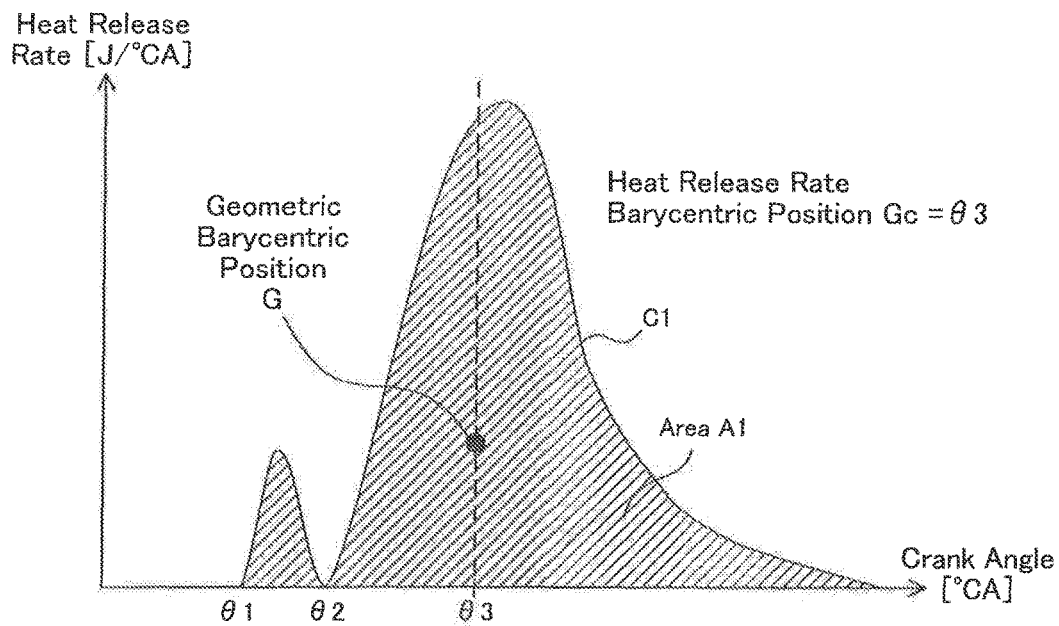
(B) Advancing the Pilot Injection
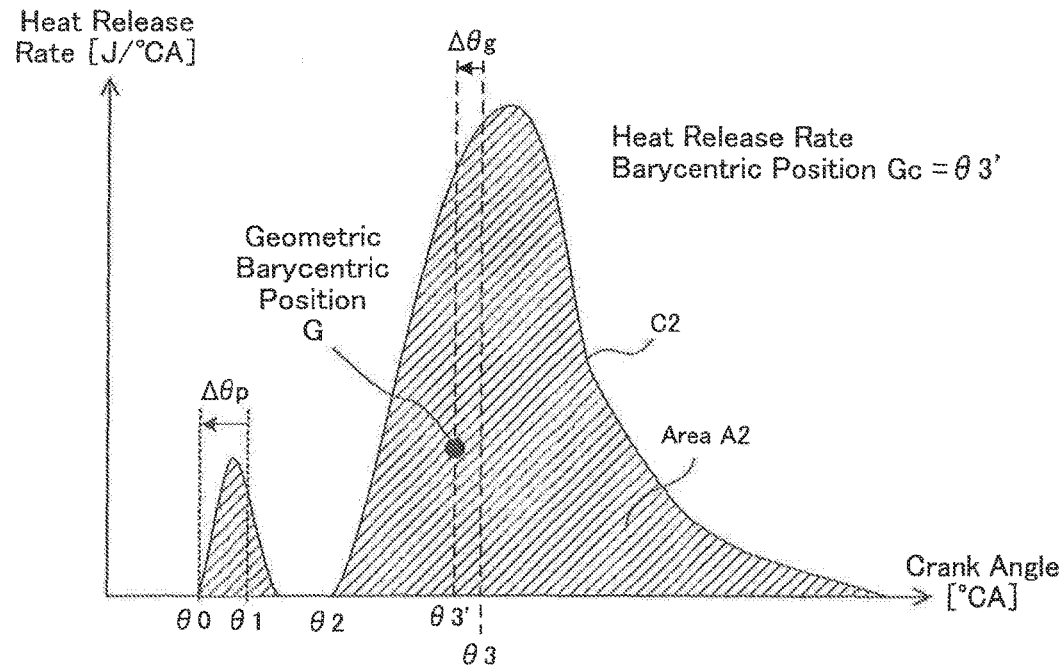

<First Embodiment>

<Forth Embodiment>

<Fifth Embodiment>

FIG. 17
(A) Waveform
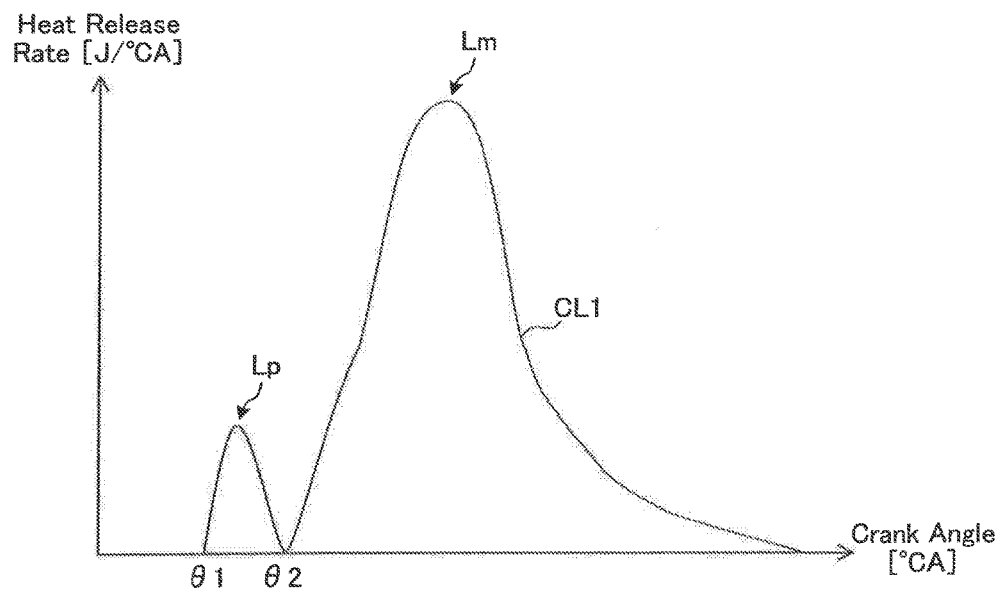
(B) Combustion Barycentric Angle
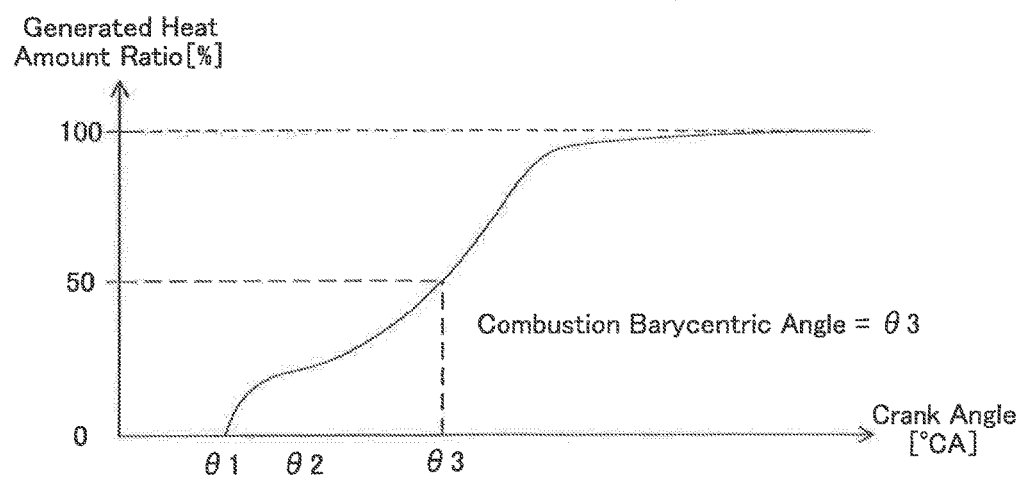

FIG. 18
(A) Waveform
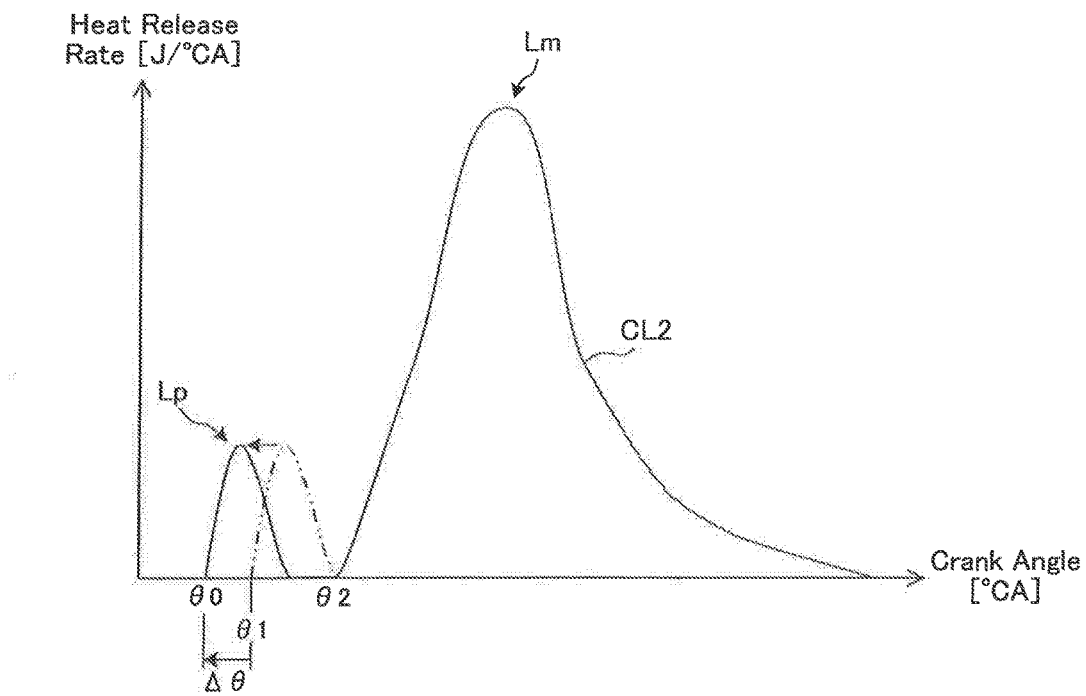
(B) Combustion Barycentric Angle
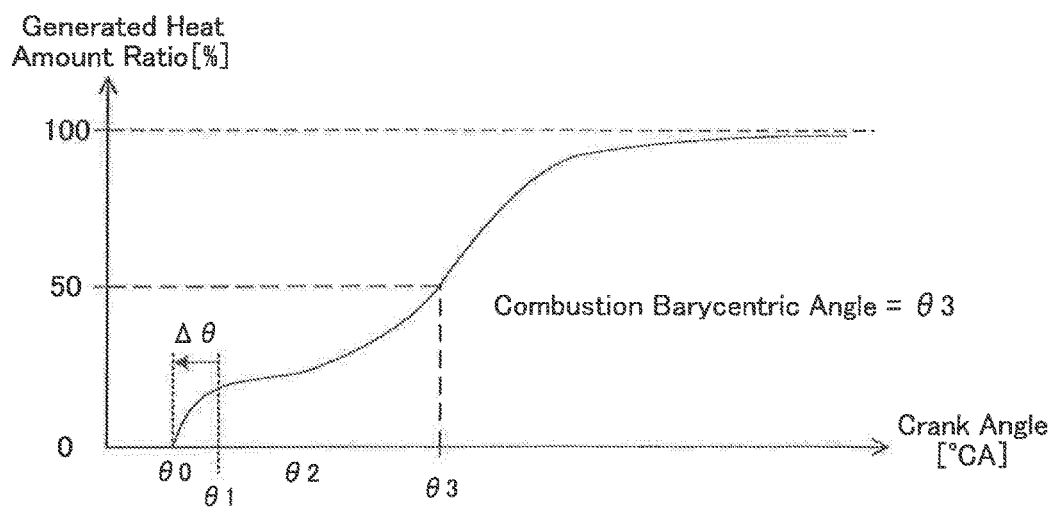

US 10,208,701 B2

ENGINE CONTROL APPARATUS FOR EXECUTING BARYCENTRIC POSITION CONTROL AND SPECIFIC CONTROL

CROSS-REFERENCE TO RELATED APPLICATIONS

This application is a national phase application of International Application No. PCT/JP2014/083065, filed Dec. 9, 2014, and claims the priority of Japanese Application No. 2013-257328, filed Dec. 12, 2013, the content of both of which is incorporated herein by reference.

TECHNICAL FIELD

The present invention relates to an engine control apparatus, applied to an internal combustion engine having an EGR apparatus which controls combustion states of fuel in the engine.

BACKGROUND ART

In general, when an internal combustion engine such as a diesel engine (hereinafter, referred to as an "engine") is in operation, all of energy generated by combustion of mixture gas cannot be transduced to a work to rotate a crankshaft, and thus, a loss is inevitably generated. The loss includes a cooling loss transduced to an increase in temperature of the engine itself and cooling water, an exhaust loss emitted to the atmosphere by exhausted gas, a pumping loss generated as intake and exhaust, a mechanical resistance loss, and so on. Among these, the cooling loss and the exhaust loss account for a significant proportion of the entire loss. Thus, in order to improve fuel consumption ratio, it is effective to reduce the cooling loss and the exhaust loss.

However, in general, the cooling loss and the exhaust loss are in trade-off relationship, and therefore, it is difficult to reduce both of the cooling loss and the exhaust loss at the same time in most cases. For example, in a case in which an engine has a supercharger, the exhaust loss decreases as the supercharging pressure increases, since the energy of the exhausted gas is effectively utilized. On the other hand, combustion temperature increases as the compression ratio substantially increases, and thus, the cooling loss increases. Accordingly, in some cases, the sum of those losses may increase.

In order to reduce the sum of the losses, a control apparatus which controls a combustion state of fuel supplied (injected) to an engine (hereinafter, simply referred to as a "combustion state of an engine") needs to control optimally various parameters which change the combustion state such as a fuel injection amount and an injection timing, and an EGR gas amount, in addition to the supercharging pressure described above, in response to an operational state of the engine (a rotational speed, an output power, and so on). The parameters which change the combustion state (that is, the parameters which affect the combustion state described above) are simply referred to as "combustion parameters". It is difficult, however, to determine the combustion parameters through experiments or the like in advance such that those coincide with optimal values in regard to each operational state, and thus, it is necessary to conduct an enormous number of experiments in order to determine those. Therefore, methods to determine the combustion parameters in a systematic manner have been developed.

For example, one of conventional control apparatuses for an internal combustion engine (hereinafter, referred to as a "conventional apparatus") calculates a crank angle at which a half of total heat amount generated during a combustion stroke is generated (hereinafter, the crank angle being referred to as a "Combustion Barycentric Angle"). Furthermore, when the Combustion Barycentric Angle is different/depart from a predetermined reference value, the conventional apparatus makes the Combustion Barycentric Angle become equate to the reference value by correcting injection timing or by adjusting oxygen density in combustion chambers (in cylinders) through adjustment of an EGR ratio (an amount of EGR gas) (e.g., refer to Patent Literature 1).

CITATION LIST

Patent Literature

<Patent Literature 1> Japanese Patent Application Laid-Open (kokai) No. 2011-202629

SUMMARY OF THE INVENTION

Incidentally, for example, as for diesel engines, a multiple injection, in/by which the fuel is injected plural times for a combustion of one cycle, is performed in some cases. More specifically, as for diesel engines, pilot injections are executed prior to a main injection in some cases. In this case, a relationship between a crank angle and a heat release rate (heat generation rate, an amount of heat generated by combustion per unit crank angle) is, for example, shown by a waveform as a curved line CL1 in FIG. 17(A). This waveform is referred to as a "combustion waveform." The waveform shown in FIG. 17(A) reaches the local maximum value Lp owing to the pilot injection initiated at the crank angle $\theta1$, and reaches the maximum value Lm owing to the main injection initiated at the crank angle $\theta2$.

Further, FIG. 17(B) shows a relationship between a crank angle and a "ratio of an integrated value of a heat amount generated by the combustion shown by the curved line CL1 to a total heat generation amount (the ratio being a generated heat amount ratio)". As shown in FIG. 17(B), the Combustion Barycentric Angle (the crank angle at which the generated heat amount ratio becomes equal to 50%) described above is the crank angle $\theta3$.

In contrast, as shown by the curved line CL2 in FIG. 18(A), in a case in which only the initiating timing of the pilot injection is advanced from the crank angle $\theta1$ to the crank angle $\theta0$ by $\Delta\theta$, a crank angle (heat generation starting angle) at which a heat generation starts by the combustion of the fuel supplied by the pilot injection moves to an advance side by $\Delta\theta$. However, as for the combustion shown in FIG. 17(A) and FIG. 18(A), because the Combustion Barycentric Angles are after the combustion start of a fuel supplied by the main injection (i.e., after the crank angle $\theta2$), the Combustion Barycentric Angle remains the crank angle $\theta3$ without a change, as understood from FIG. 18(B) which shows the generated heat amount ratio of the combustion using the curved line CL2. That is, there are cases in which the Combustion Barycentric Angle does not change even though the combustion waveform changes by moving of the pilot injection timing to the advance side. In other words, the Combustion Barycentric Angle is not necessarily an index which can accurately reflects an aspect (or a state) of the combustion of each cycle.

In actuality, the inventors measured relationships between the Combustion Barycentric Angle and a "fuel efficiency deterioration ratio" for/with respect to various engine rotational speeds, the efficiency deterioration ratio being a ratio of a fuel consumption ratio with respect to (at) the various Combustion Barycentric Angles to a fuel consumption ratio with respect to (at) the Combustion Barycentric Angle (the best fuel efficiency point) where the fuel consumption ratio becomes the lowest. The results are shown in FIG. 19. The curved line Hb1 through the curved line Hb3 in FIG. 19 are the measurement results in case of a low rotational speed and a low engine load, a medium rotational speed and a medium engine load, and a high rotational speed and a high engine load, respectively. As understood from FIG. 19, the inventors have obtained the knowledge that the Combustion Barycentric Angle where the fuel efficiency deterioration ratio becomes the lowest changes, as engine rotational speed and engine load changes. In other words, it was found that even when the combustion state is controlled such that the Combustion Barycentric Angle coincides with a constant reference value, the fuel efficiency deterioration ratio may not become the lowest, if engine rotational speed and engine load change.

In view of the above, the inventors have focused on a "Heat Release Rate Barycentric Position" as an index value representing the combustion state, in place of the Combustion Barycentric Angle which is conventionally used. The Heat Release Rate Barycentric Position is defined by various methods described below. The Heat Release Rate Barycentric Position is expressed by a crank angle.

(Definition 1) The Heat Release Rate Barycentric Position is a crank angle corresponding to the geometric barycentric position (geometrical center of gravity) of an area surrounded by a "waveform of the heat release rate drawn on a graph where one axis corresponds to the crank angles for each cycle and the another axis orthogonal to the one axis corresponds to the heat release rate" and "the one axis."

(Definition 2) The Heat Release Rate Barycentric Position is a crank angle at which,
an integrated value, with respect to the crank angle, of products of a "crank angle difference between 'each arbitrary crank angle on an advance side with respect to a specific crank angle' and the 'specific crank angle'" and the "heat release rate at the arbitrary crank angle"
and
an integrated value, with respect to the crank angle, of products of a "crank angle difference between 'each arbitrary crank angle on a retard side with respect to the specific crank angle' and the 'specific crank angle'" and the "heat release rate at the arbitrary crank angle"
are equal to each other.

In other words, the Heat Release Rate Barycentric Position Gc is a crank angle at which the following formula (1) is satisfied in each cycle, wherein CAs is a crank angle (combustion starting angle) at/from which the combustion of the fuel starts, CAe is a crank angle at which the combustion ends, θ is the arbitrary crank angle, and dQ(θ) is the heat release rate at the crank angle θ. It should be noted that the crank angle θ is expressed as an angle after the compression top dead center, and thus, the crank angle θ is a negative value when the crank angel is on the advance side with respect to the compression top dead center.

[Math. 1]

$$\int_{CAs}^{Gc}(Gc-\theta)dQ(\theta)d\theta = \int_{Gc}^{CAe}(\theta-Gc)dQ(\theta)d\theta \qquad (1)$$

(Definition 3) By properly deforming the formula (1) described above, following formula (2) is obtained. Therefore, when expressing the Definition 2 differently, the Heat Release Rate Barycentric Position Gc can be defined as a specific crank angle at which the value obtained by integrating, with respect to the crank angle, products of a "value (θ−Gc) obtained by subtracting the specific crank angle (Gc) from each arbitrary crank angle (θ) for each cycle" and the "heat release rate (dQ(θ)) at the arbitrary crank angle (θ)" becomes equal to "0."

[Math. 2]

$$\int_{CAs}^{CAe}(\theta-Gc)d(dQ(\theta)d\theta = 0 \qquad (2)$$

(Definition 4) The Heat Release Rate Barycentric Position is a value Gc obtained by calculation for each cycle based on the following formula (3), wherein CAs is the crank angle at/from which the combustion of the fuel starts, CAe is the crank angle at which the combustion ends, θ is the arbitrary crank angle, and dQ(θ) is the heat release rate at the crank angle θ.

[Math. 3]

$$Gc = \frac{\int_{CAs}^{CAe}(\theta-CAs)dQ(\theta)d\theta}{\int_{CAs}^{CAe}dQ(\theta)d\theta} + CAs \qquad (3)$$

(Definition 5) Definition 4 described above can also be regarded as follows. That is, the Heat Release Rate Barycentric Position is a value obtained by adding the combustion starting angle (CAs) to a value obtained by dividing an "integrated value of products of 'difference (θ−CAs) between each arbitrary crank angle (θ) and the combustion starting angle (CAs)' and the 'heat release rate at the arbitrary crank angle (θ)' with respect to the crank angle" by an "area of a region defined by the waveform of the heat release rate with respect to the crank angle."

The Heat Release Rate Barycentric Position is, for example, a crank angle θ3 corresponding to a geometric barycentric position G of the area A1 surrounded by the curved line C1 and the abscissa axis representing crank angles in the example shown in FIG. 1(A). In addition, as shown in FIG. 1(B), in case in which the initiating timing of the pilot injection is advanced from the crank angle θ1 to the crank angle θ0 by Δθp, the Heat Release Rate Barycentric Position Gc moves to the advance side by Δθg so as to become the crank angle θ3' due to the change in the initiating timing of the pilot injection. Thus, it can be said that the Heat Release Rate Barycentric Position is an index value that reflects the combustion state more accurately than the Combustion Barycentric Angle which is the conventional index value, the combustion state changing due to the heat generated by the pilot injection.

There are various means (that is, the combustion parameters) to move/change the Heat Release Rate Barycentric Position toward the advance side or the retard side. For example, it is possible to advance the Heat Release Rate Barycentric Position by executing/performing at least one of operations listed below.

(1a) An operation to move a timing of a main injection to the advance side;
(2a) An operation to increase a fuel injection pressure;
(3a) An operation to increase an (fuel) injection amount of each of the pilot injections;
(4a) An operation to move a "Heat Release Rate Barycentric Position of the pilot injection(s)" determined based on a heat generated by a combustion of the fuel supplied by the pilot injection into a cylinder, to the advance side;

(5a) An operation to increase a supercharging pressure; and
(6a) An operation to decrease an EGR gas amount (a EGR ratio).

On the other hand, it is possible to retard the Heat Release Rate Barycentric Position by executing/performing at least one of operations listed below.
(1b) An operation to move the timing of the main injection to the retard side;
(2b) An operation to decrease the fuel injection pressure;
(3b) An operation to decrease the (fuel) injection amount of each of the pilot injections;
(4b) An operation to move the "Heat Release Rate Barycentric Position of the pilot injection(s)" to the retard side;
(5b) An operation to decrease the supercharging pressure; and
(6b) An operation to increase the EGR gas amount.

Further, the inventors measured "relationships between the Heat Release Rate Barycentric Position and the fuel efficiency deterioration ratio" for various combinations of the engine load (required torque) and the engine rotational speeds. The results are shown in FIG. 2. The curved line Gc1 through the curved line Gc3 in FIG. 2 are the measurement results in case of a low rotational speed and a low engine load, a medium rotational speed and a medium engine load, and a high rotational speed and a high engine load, respectively. As understood from FIG. 2, even if the engine rotational speed and/or the engine load change, the Heat Release Rate Barycentric Position corresponding to a case in which the fuel efficiency deterioration ratio is minimal coincides with a specific (constant) crank angle θa (in the example of FIG. 2, θa is 7° crank angle after the compression top dead center). In other words, it was found that, unlike the Combustion Barycentric Angle shown in FIG. 17, the fuel efficiency deterioration ratio remains/becomes an approximately constant value which is close to the minimum value as long as the Heat Release Rate Barycentric Position is in the neighborhood of the crank angle θa, even if the engine rotational speed and/or the engine load change(s).

In view of the above, the inventors have obtained the knowledge that the Heat Release Rate Barycentric Position is a good index (value) which accurately reflects the combustion state, and thus, the combustion state of the engine can be maintained at a specific state and the fuel efficiency (fuel consumption ratio) can be improved, by maintaining the Heat Release Rate Barycentric Position at the predetermined constant value (e.g., a reference crank angle in the neighborhood of the crank angle θa described above) regardless of the engine load (and/or the engine rotational speed). Accordingly, the inventors have been developing an engine control apparatus which maintains the Heat Release Rate Barycentric Position at a constant crank angle (a reference crank angle) regardless of the engine load (and/or the engine rotational speed). However, it was found that, in case in which the engine is equipped with an EGR apparatus, a combustion noise may be excessively loud, if the control for maintaining the Heat Release Rate Barycentric Position at the constant crank angle (hereinafter, referred to as "Heat Release Rate Barycentric Position Control" or "Barycentric Position Control") is executed. The reason for this will next be described.

As is well known, the EGR (exhaust gas recirculation) apparatus is an apparatus which recirculates a part of an exhaust gas as an EGR gas into the cylinders to decrease the maximum temperature in cylinders during the combustion of the fuel, and thereby, decreasing a density of NOx contained in the exhaust gas.

However, in a case in which the EGR is executed, a time period from an injection of the fuel to an ignition of the fuel may become longer, compared to a case in which no EGR gas is present/introduced, since a density of oxygen in the cylinders decreases because of existence of the EGR gas. This time period from the injection of the fuel to the ignition is referred to as an "ignition lag." That is, the ignition lag may become longer due to the existence of the EGR gas in the cylinder.

Further, the ignition lag may become longer as the fuel injection amount becomes smaller. For example, the ignition lag may become longer when the engine load is low than when the engine load is high, because the fuel amount injected into the cylinder is lower as the engine load is lower. The ignition lag may also become longer when the engine rotational speed is low than when the engine rotational speed is high, because an air amount introduced into the cylinder is lower as the engine rotational speed is lower. In addition, even if the engine is equipped with a supercharger, the ignition lag may become longer when the engine load is low or the engine rotational speed is low than when the engine load is high or the engine rotational speed is high, because a rotational speeds of a turbine and a compressor of the supercharger becomes lower as the engine load is lower or the engine rotational speed is lower. That is, it is more likely that the ignition lag becomes excessively long, in a case in which the EGR gas exists in the cylinder, and in addition, an operational state of the engine is at the low engine load or the low rotational speed.

If the ignition lag is relatively short, the fuel injected from a fuel injection valve promptly ignites and starts to be combusted. Thereafter, the fuel which is additionally injected from the fuel injection valve starts to be combusted immediately, utilizing the fuel which has already started to be combusted as an ignition source.

In contrast, if the ignition lag is relatively long, the fuel injected from the fuel injection valve does not ignite promptly, and spreads in the cylinder so as to be mixed with air. Thereafter, the fuel which has already been mixed with the air combusts all at once immediately after the fuel ignites. As a result, a pressure in the cylinder (that is, a cylinder pressure) increases drastically/rapidly, and thus, the combustion noise becomes excessively loud.

More specifically, a volume of the combustion noise correlates with the increased amount of the cylinder pressure per unit time. As the ignition lag is longer, the cylinder pressure increases rapidly/drastically due to the combustion of the fuel in the cylinder which occurs all at once. Accordingly, the increased amount of the cylinder pressure per unit time becomes large, when the combustion starts. As a result, the combustion noise becomes louder when the ignition lag is long than the ignition lag is short.

As described above, when the Barycentric Position Control is executed for the engine having the EGR apparatus, the combustion noise may become relatively loud, especially, in the case that the engine load or the engine rotational speed is low. Therefore, for example, in a case that such an engine is mounted on an automobile, there arises a problem that a driver of the automobile feels uncomfortable about the noise.

In view of the above, one of the objects of the present invention is to provide a "control apparatus for an engine equipped with an EGR apparatus" which can improve a fuel efficiency and decrease/lower a combustion noise, utilizing the Barycentric Position Control.

The engine control apparatus (hereinafter, referred to as a "present invention apparatus") for/of an internal combustion engine according to the present invention to achieve the object described above is applied to an internal combustion engine having an EGR apparatus. Further, the present invention apparatus comprises a control section which sets combustion parameter(s) to control a combustion state of the engine.

Further, the control section executes/performs a Barycentric Position Control which sets (to set) the combustion parameter(s) such that the Heat Release Rate Barycentric Position which represents the combustion state coincides with (becomes equal to) a constant reference crank angle when the engine is in a predetermined operational state.

Furthermore, the control section executes/performs a specific control in place of the Barycentric Position Control, when a specific condition is satisfied, the specific condition being a condition in which an EGR by the EGR apparatus is being executed (EGR is in execution), and a load of the engine is lower than a predetermined load threshold or a rotational speed of the engine is lower than a predetermined rotational speed threshold.

Here, the specific control is a control which sets (to set) the combustion parameters such that a maximum value of an increased amount per unit time of a cylinder pressure (that is, "in-cylinder pressure increasing rate") at/for an arbitrary operational state in a case in which the specific condition is satisfied is lower than a maximum value of the increased amount of the cylinder pressure at/for the arbitrary operational state in a case in which the Barycentric Position Control is executed.

According to the present invention apparatus, when the specific condition described above is satisfied (that is, when there is a possibility that the combustion noise becomes excessively loud if the Barycentric Position Control is (would otherwise be) executed), the maximum value of the in-cylinder pressure increasing rate is decreased. As a result, the fuel efficiency can be improved owing to the Barycentric Position Control while the specific condition is not satisfied, and the combustion noise can be suppressed while the specific condition is satisfied.

In one of aspects of the present invention apparatus, the control section executes a control, as the specific control, which shortens a time required for a fuel injected into the cylinder to ignite so as to start to be combusted (that is, the ignition lag which is the time period from the injection of the fuel to the start of the combustion of the injected fuel).

According to this aspect, because the ignition lag does not become excessively long, it is possible to lessen an amount of the fuel which spreads in the cylinder before the combustion is started. Thus, it is possible to avoid the rapid increase in the cylinder pressure when the combustion is started so that the combustion noise can be suppressed.

More specifically, the engine comprises a supercharger, and, the control section of the above aspect executes a control, as the specific control, to increase a supercharging pressure which is one of the combustion parameters.

According to the aspect described above, an amount of oxygen flowing into the cylinder increases owing to an increase in the supercharging pressure. The increase in the oxygen amount makes the fuel in the cylinder ignite more easily, and thus, the ignition lag does not become longer. Further, the increase of the supercharging pressure rises the pressure in the cylinder. The increase of the pressure in the cylinder rises a temperature in the cylinder, so that an atomization and a vaporization of the fuel injected into the cylinder is promoted. As a result, the injected fuel starts to be combusted promptly. Therefore, the growth of the ignition lag can be avoided.

In another aspect of the present invention apparatus, the control section executes, as the specific control, a control which extends a time (time period) from a "pilot injection (specifically, an end point in time of the pilot injection) executed immediately before a main injection" to the "main injection (specifically, a start point in time of the main injection)."

According to the aspect described above, it is possible to avoid a state in which an "amount of heat generated per unit time (main injection heat release rate) by a combustion of the fuel of the main injection" becomes large in a period in which an "amount of heat generated per unit time (pilot injection heat release rate) by a combustion of the fuel of the pilot injection" is large. In other words, it is possible to avoid an occurrence of the period in which a sum of the pilot injection heat release rate and the main injection heat release rate is high. As a result, it is possible to avoid the rapid increase of the pressure in the cylinder.

In addition, because the main injection is initiated after an increase of the temperature in the cylinder owing to the combustion of the fuel injected by the pilot injection, the fuel injected by the main injection starts to be combusted immediately. Therefore, it is possible to decrease the maximum value of the in-cylinder pressure increasing rate at the timing of the combustion of the fuel injected by the main injection.

More specifically, the control section of the aspect executes, as the specific control, at least one of:

a control which advances an injection timing of the pilot injection (the end point in time of the pilot injection) which is one of the combustion parameters; and, a control which retards an injection timing of the main injection (the start point in time of the main injection) which is one of the combustion parameters.

According to the aspect described above, it is possible to extend the time (period) from the end point in time of the pilot injection to the start point in time of the main injection without fail.

In another aspect of the present invention apparatus, the control section executes, as the specific control, a control which increases a combustion chamber volume increasing rate at a point in time of combustion start of the fuel injected by the main injection.

Specifically, a piston moves upward in a compression stroke and starts to move downward after it reaches the compression top dead center. A downstroke speed of the piston increases during a period from a point in time at which the position of the piston is at the compression top dead center to a point in time at which the position of the piston reaches a crank angle of 90° after the compression top dead center. During that period, an increasing amount per unit time of the combustion chamber volume in the cylinder (i.e., the combustion chamber volume increasing rate) increases. As the combustion chamber volume increasing rate at the timing of the generation of the combustion becomes larger, an increase of the pressure in the cylinder caused by the combustion is more suppressed by the increase of the combustion chamber volume. Thus, according to the aspect described above, the maximum value of the in-cylinder pressure increasing rate when the fuel injected by the main injection combusts can be decreased.

More specifically, the control section of the aspect executes a control, as the specific control, which retards an injection timing of a main injection, the injection timing being one of the combustion parameters.

According to the aspect described above, it is possible to readily control a "timing (point in time) at which the fuel injected by the main injection starts to combust" such that the timing coincides with a "timing (point in time) at which the combustion chamber volume increasing rate is high."

In another aspect of the present invention apparatus, the control section executes, as the specific control, a control which decreases a combustion speed of the fuel injected by the main injection.

According to the aspect described above, the combustion speed is decreased, and thus, the heat release rate decreases. As a result, the rapid increase of the pressure in the cylinder is suppressed, and thus, the maximum value of the in-cylinder pressure increasing rate can be lowered.

More specifically, the control section of the aspect executes, as the specific control, a control which decreases an injection pressure of the fuel (that is, the fuel injection pressure) which is one of the combustion parameters.

According to the aspect described above, a particle diameter of the injected fuel becomes larger as the fuel injection pressure becomes lower. The required time for atomizing and vaporizing the fuel becomes longer as the particle diameter of the fuel becomes larger, and therefore, the above aspect can decrease the combustion speed.

It should be noted that the present invention can be applied to an automobile equipped with the internal combustion engine to which the present invention apparatus described above is applied, and, further, may include a method used in the present invention apparatus described above.

BRIEF DESCRIPTION OF THE DRAWINGS

FIG. 1 is a graph to explain the Heat Release Rate Barycentric Position.

FIG. 17 is a graph to explain a Combustion Barycentric Angle.

FIG. 18 is a graph to explain the Combustion Barycentric Angle in a case where combustion states changes.

DESCRIPTION OF EMBODIMENTS

Each of engine control apparatuses according to embodiments of the present invention will next be described with reference to the drawings.

First Embodiment

Figure 2:
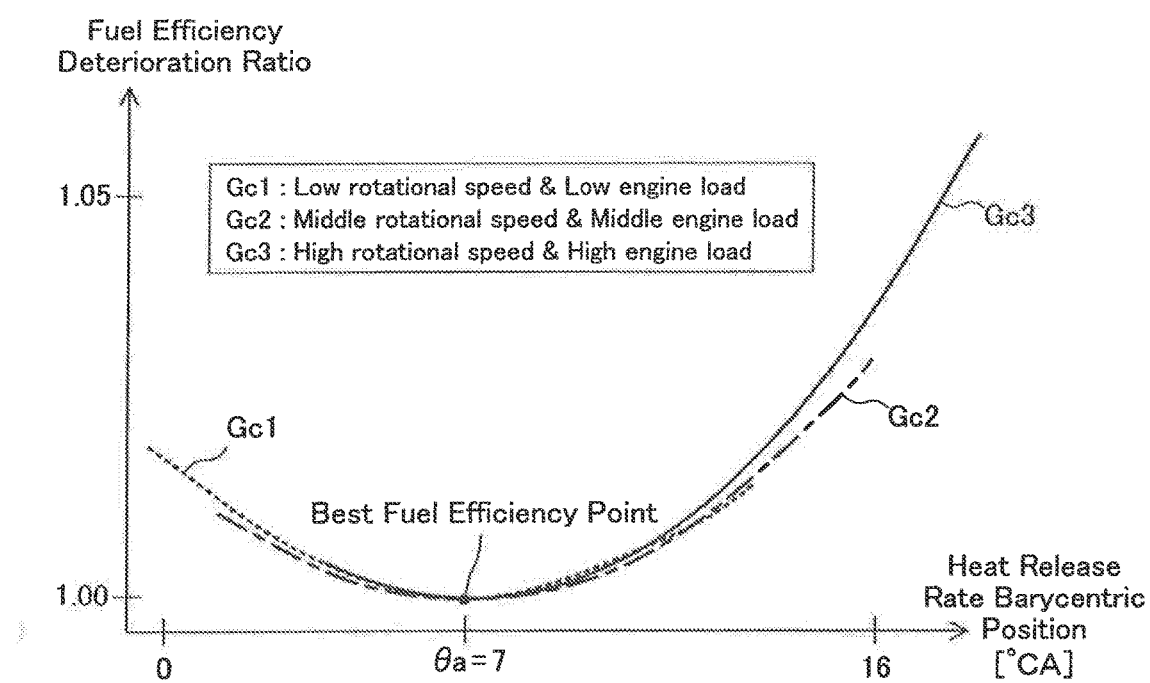
FIG. 2 is a graph showing relationships between the Heat Release Rate Barycentric Position and a fuel efficiency deterioration ratio for various combinations of an engine load and an engine rotational speed.
Figure 3:
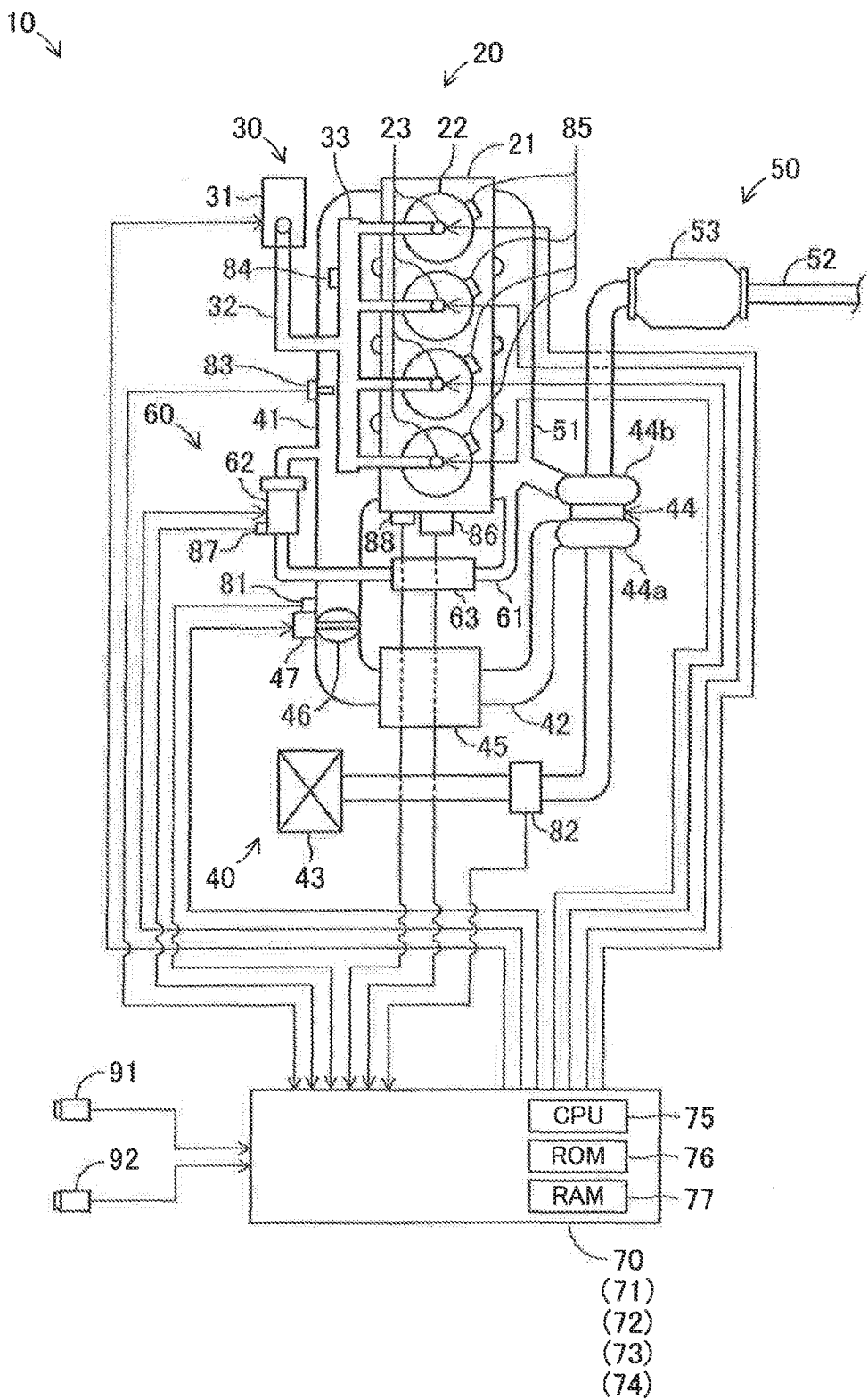
FIG. 3 is a schematic diagram of an internal combustion engine to which a control apparatus (first apparatus) according to a first embodiment of the present invention is applied.

An engine control apparatus (hereinafter, referred to as a "first apparatus") according to the first embodiment of the present invention is applied to an engine 10 shown in FIG. 3. The engine 10 is a multi-cylinder (4 cylinder) diesel engine. The engine 10 is mounted on an unillustrated automobile.

The engine 10 includes an engine body part 20, a fuel supply system 30, an intake system 40, an exhaust system 50, and an EGR system (EGR apparatus) 60.

The engine body part 20 includes an engine body 21 including a cylinder block, a cylinder head, a crank case, and so on. In the engine body 21, 4 cylinders (combustion chambers) 22 are formed. At the top of each of the cylinders 22, each of fuel injection valves (injectors) 23 is disposed. The fuel injection valve 23 is configured so as to open in response to instructions from an ECU (Electric Control Unit) 70 described later to inject a fuel directly into each of the cylinders 22.

The fuel supply system 30 includes a fuel pressurization pump (a supply pump) 31, a fuel delivery pipe 32, and an accumulator (a common rail) 33. An outlet of the fuel pressurization pump 31 is connected to the fuel delivery pipe 32. The fuel delivery pipe 32 is connected to the accumulator 33. The accumulator 33 is connected to the fuel injection valves 23.

The fuel pressurization pump 31 is configured so as to pump up a fuel pooled/stored in an unillustrated fuel tank, pressurize the fuel, and then supply the pressurized fuel to the accumulator 33 through the fuel delivery pipe 32. The fuel pressurization pump 31 operates by a drive shaft coupled with an unillustrated crank shaft of the engine 10. The fuel pressurization pump 31 is configured so as to be able to adjust a pressure of the fuel in the accumulator 33 (that is, a fuel injection pressure (a rail pressure) Fp, which is an injection pressure of the fuel) in response to the instructions from the ECU 70.

The intake system 40 includes an intake manifold 41, an intake pipe 42, an air cleaner 43, a compressor 44a of a supercharger 44, an intercooler 45, a throttle valve 46, and a throttle valve actuator 47.

The intake manifold 41 includes branch parts which are connected to each of the cylinders 22, and an aggregated portion into which the branch parts merge. The intake pipe 42 is connected to the aggregated portion of the intake manifold 41. The intake manifold 41 and the intake pipe 42 constitute an intake passage. On/In the intake pipe 42, the air cleaner 43, the compressor 44a, the intercooler 45, and the throttle valve 46 are disposed from an upstream side to a downstream side of a flow of an intake air. The throttle valve actuator 47 is configured so as to change an opening degree of the throttle valve 46 in response to instructions from the ECU 70.

The intercooler 45 is configured so as to decrease an intake air temperature (a temperature of the intake air). The intercooler 45 comprises an unillustrated bypass passage, and an unillustrated bypass valve disposed in the bypass passage. Further, the intercooler 45 is configured so as to be able to adjust an amount of a coolant water (refrigerant) which is circulated from the intercooler 45 to an unillustrated cooling device (or vice versa).

The exhaust system 50 includes an exhaust manifold 51, an exhaust pipe 52, a turbine 44b of the supercharger 44, and an exhaust gas purification catalyst 53.

The exhaust manifold 51 includes branch parts which are connected to each of the cylinders 22, and an aggregated portion into which the branch parts merge. The exhaust pipe 52 is connected to the aggregated portion of the exhaust manifold 51. The exhaust manifold 51 and the exhaust pipe 52 constitute an exhaust passage. On/In the exhaust pipe 52, the turbine 44b and the exhaust gas purification catalyst 53 are disposed from an upstream side to a downstream side of a flow of a combustion/exhaust gas.

The supercharger 44 is a well-known variable geometry type supercharger. The turbine 44b is equipped with unillustrated plural nozzle vanes (variable nozzles). Further, the turbine 44b of the supercharger 44 comprises "a bypass passage of the turbine 44b, and a bypass valve disposed in the bypass passage", which are both unillustrated. An opening degree of the nozzle vanes, and an opening degree of the bypass valve are configured so as to be changed in response to instructions from the ECU 70, thereby, varying (controlling) a supercharging pressure Tp. That is, in the present specification, a "control the supercharger 44" means varying the supercharging pressure Tp by changing an angle of the nozzle vanes and/or an opening degree of the bypass valve.

The EGR system 60 includes an exhaust recirculating pipe 61, an EGR control valve 62, and an EGR cooler 63. The exhaust recirculating pipe 61 communicates between a position of the exhaust passage (the exhaust manifold 51) upstream of the turbine 44b and a position of the intake passage (the intake manifold 41) downstream of the throttle valve 46. The exhaust recirculating pipe 61 constitutes an EGR gas passage.

The EGR control valve 62 is disposed in the exhaust recirculating pipe 61. The EGR control valve 62 is configured so as to change an amount (an EGR gas amount) of an exhaust gas which is recirculated from the exhausted passage to the intake passage by means of varying a cross-sectional area of the EGR gas passage in respond to instructions from the ECU 70. The EGR cooler 63 is disposed in the exhaust recirculating pipe 61, and is configured so as to decrease a temperature of the EGR gas passing through the exhaust recirculating pipe 61.

The ECU 70 includes a CPU 75, a ROM 76 in which programs executed by the CPU 75 and maps are stored in advance, a RAM 77 in which data is stored temporarily. The ECU 70 is connected to sensors described below, and is configured so as to receive (input) signals (data) from those sensors. Further, the ECU 70 is configured so as to send (provide) instruction (drive) signals to various actuators.

The ECU 70 is connected to a throttle valve opening sensor 81, an air flow meter 82, an intake pipe pressure sensor 83, a fuel pressure sensor 84, in-cylinder pressure sensors 85, a crank angle sensor 86, an EGR control valve opening sensor 87, and a water temperature sensor 88. The ECU 70 is also connected to an accelerator opening sensor 91, and a speed sensor 92.

The throttle valve opening sensor 81 detects an opening degree of the throttle valve 46, and outputs a signal representing a throttle valve opening TA. The air flow meter 82 measures a mass flow rate (an intake air flow rate) of the intake air (a new air containing no EGR gas) flowing through the intake passage, and outputs a signal representing an intake air flow rate Ga. The intake pipe pressure sensor 83 outputs a signal representing a pressure Pm of a gas introduced into each of the cylinders (combustion chambers) 22 of the engine 10. The fuel pressure sensor 84 detects a pressure of the fuel in the accumulator 33, and outputs a signal representing a fuel pressure Ep. Each of the in-cylinder pressure sensors 85 is disposed so as to correspond to each of the cylinders 22. Each of the in-cylinder pressure sensors 85 detects a pressure in the corresponding cylinder (that is, in-cylinder pressure), and output a signal representing an in-cylinder pressure Pc.

The crank angle sensor 86 outputs a signal representing a rotational position of an unillustrated crankshaft (that is, the crank angle $\theta$) of the engine 10. The ECU 70 obtains the crank angle (an absolute crank angle) $\theta$ of the engine 10 with respect to the compression top dead center of a predetermined cylinder, based on the signals from the crank angle sensor 86 and an unillustrated cam position sensor. Further, the ECU 70 obtains an engine rotational speed NE based on the signal from the crank angle sensor 86. The EGR control valve opening sensor 87 outputs a signal representing a valve opening ratio (an opening degree) Er of the EGR control valve 62. The water temperature sensor 88 outputs a signal representing a coolant water temperature THW.

The accelerator opening sensor 91 outputs a signal representing an opening degree Ap of an unillustrated accelerator pedal of the automobile on which the engine 10 is mounted. The speed sensor 92 outputs a signal representing a traveling speed Vs of the automobile on which the engine 10 is mounted.

<Barycentric Position Control>

An operation of the first apparatus will next be described. The first apparatus executes/performs a combustion control (that is, a control to set the combustion parameters) such that the Heat Release Rate Barycentric Position Gc defined according to any one of (Definition 1) through (Definition 5) described above coincides with (equates to, or becomes equal to) a predetermined Target Heat Release Rate Barycentric Position (which is a reference crank angle, and hereinafter, simply referred to as a "Target Barycentric Position") Gc*. In the present specification, this control is referred to as a "Barycentric Position Control". The Target Barycentric Position Gc* is set to/at a crank angle at which a fuel consumption ratio of the engine 10 is minimum (or a crank angle close to the angle). It should be noted that the Heat Release Rate Barycentric Position Gc remains the same (becomes congruent or coincides with each other) as long as the combustion waveform remains the same, regardless of which one of definitions form (Definition 1) through (Definition 5) described above is used.

In the first apparatus, the combustion parameters are determined in advance, and stored in the ROM 76 with respect to each operational state (the rotational speed NE, an engine load KL, and so on) of the engine such that the Heat Release Rate Barycentric Position Gc becomes equal to (coincides with) the Target Barycentric Position Gc*. The first apparatus read out the combustion parameters from the ROM 76 according to (based on) an actual operational state of the engine 10, and performs/executes a control to use those read out combustion parameters (that is, a feedforward control) so as to make the Heat Release Rate Barycentric Position Gc becomes equal to (coincides with) the Target Barycentric Position Gc*.

<Combustion Noise During the Barycentric Position Control>

A combustion noise generated by the engine 10 when the Barycentric Position Control is executed will next be described. The inventors measured the combustion noise of the engine 10 while the Barycentric Position Control is executed, and the EGR is executed (that is, in a case where the valve opening ratio Er>0). The result is shown in FIG. 4.

Figure 4:
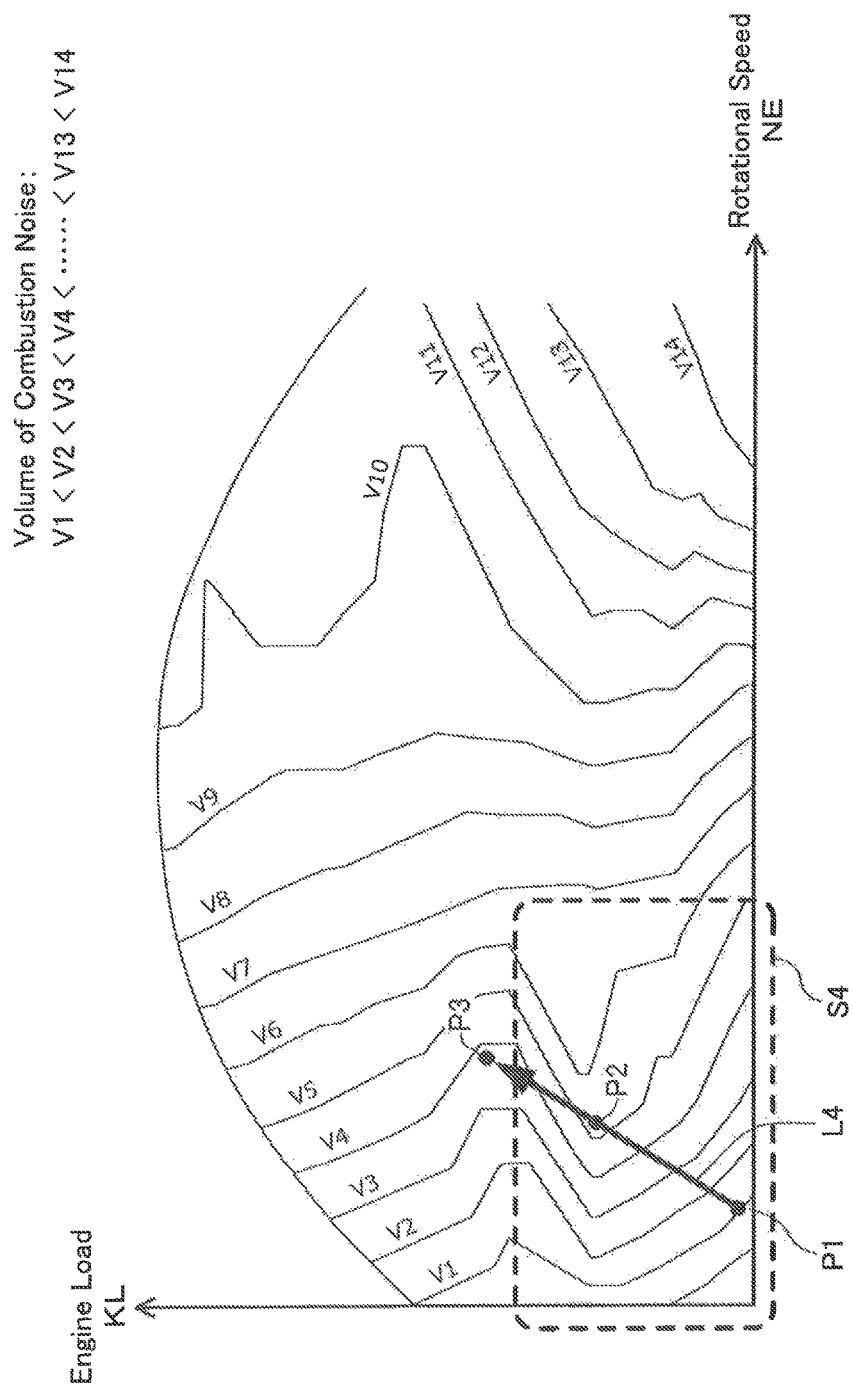
FIG. 4 is a graph showing combustion noise for each operational state of the engine.

FIG. 4 shows each of the combustion noises for each of operational states (state being represented by a combination of the rotational speed NE and the engine load KL) while the EGR is executed, by polygonal lines (contour lines) V1 through V14, joining the operational states having an equal volume. The polygonal line V1 represents operational states where combustion noise is minimum. The noise becomes louder in order of the polygonal line V2, the polygonal line V3, . . . , and the polygonal line V14 represents operational states with the maximum noise. As understood from FIG. 4, generally, the combustion noise becomes louder as the rotational speed NE and/or the engine load KL become higher. However, as understood from an area S4, an area exists where the combustion noise is relatively loud although the rotational speed NE and the engine load KL are relatively low.

For example, as for the operational states P1, P2 and P3 that are on the straight line L4, the combustion noise at the operational state P2 is louder than the combustion noise at the operational state P1, whereas the combustion noise at the operational state P3 is lower/smaller than the combustion noise at the operational state P2. Accordingly, when the operational state of the engine 10 transitions/changes from the state P1 to the state P3 via the state P2, the combustion noise becomes louder once, and then becomes lower. In other words, when the automobile on which the engine 10 is mounted is accelerated from a state of a low rotational speed and a low engine load, there can be a case/phenomenon where the combustion noise becomes louder once, and then becomes lower. It is highly likely that a driver of the automobile feels unnatural and uncomfortable about such a change of the combustion noise.

Figure 5:
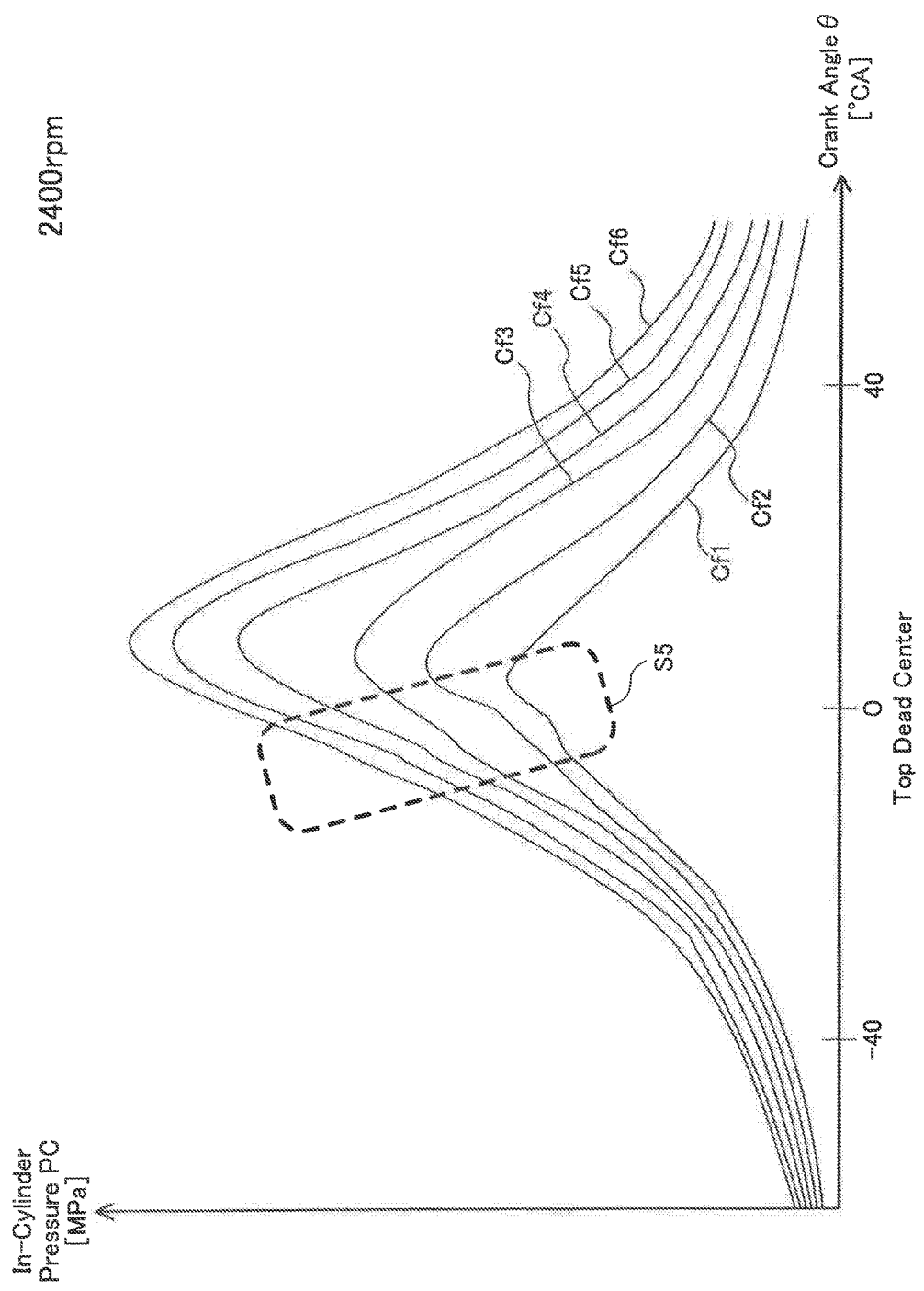
FIG. 5 is a graph showing changes of a in-cylinder pressure with respect to crank angles for each of various engine loads in a case in which a rotational speed is high.

Further, the inventors measured changes of the in-cylinder pressure Pc with respect to the crank angle θ (that is, a in-cylinder pressure waveform) for each of various combinations of the rotational speed NE and the engine load KL while the Barycentric Position Control and the EGR are both being executed/performed. FIG. 5 shows the measured result when the rotational speed NE is 2400 revolutions per minute, among those measured results. The curved line Cf1 through Cf6, shown in FIG. 5, represent the changes of the in-cylinder pressure Pc with respect to the crank angle θ for each of the engine loads KL of the engine 10. The curved line Cf1 represents the in-cylinder pressure Pc when the engine load KL is minimum. The engine load KL becomes higher in order of the curved line Cf2, the curved line Cf3, . . . , and the curved line Cf6 represents the in-cylinder pressure Pc when the engine load KL is maximum.

In this embodiment, two pilot injections are executed at a timing on the advance side with respect to a main injection, and thereafter, the main injection is executed. As understood from the area S5 in FIG. 5, the in-cylinder pressure Pc rises by the combustion of the fuel injected by the pilot injections, and thereafter, before the in-cylinder pressure Pc drops once, the fuel injected by the main injection ignites so that the in-cylinder pressure Pc further rises.

Figure 6:
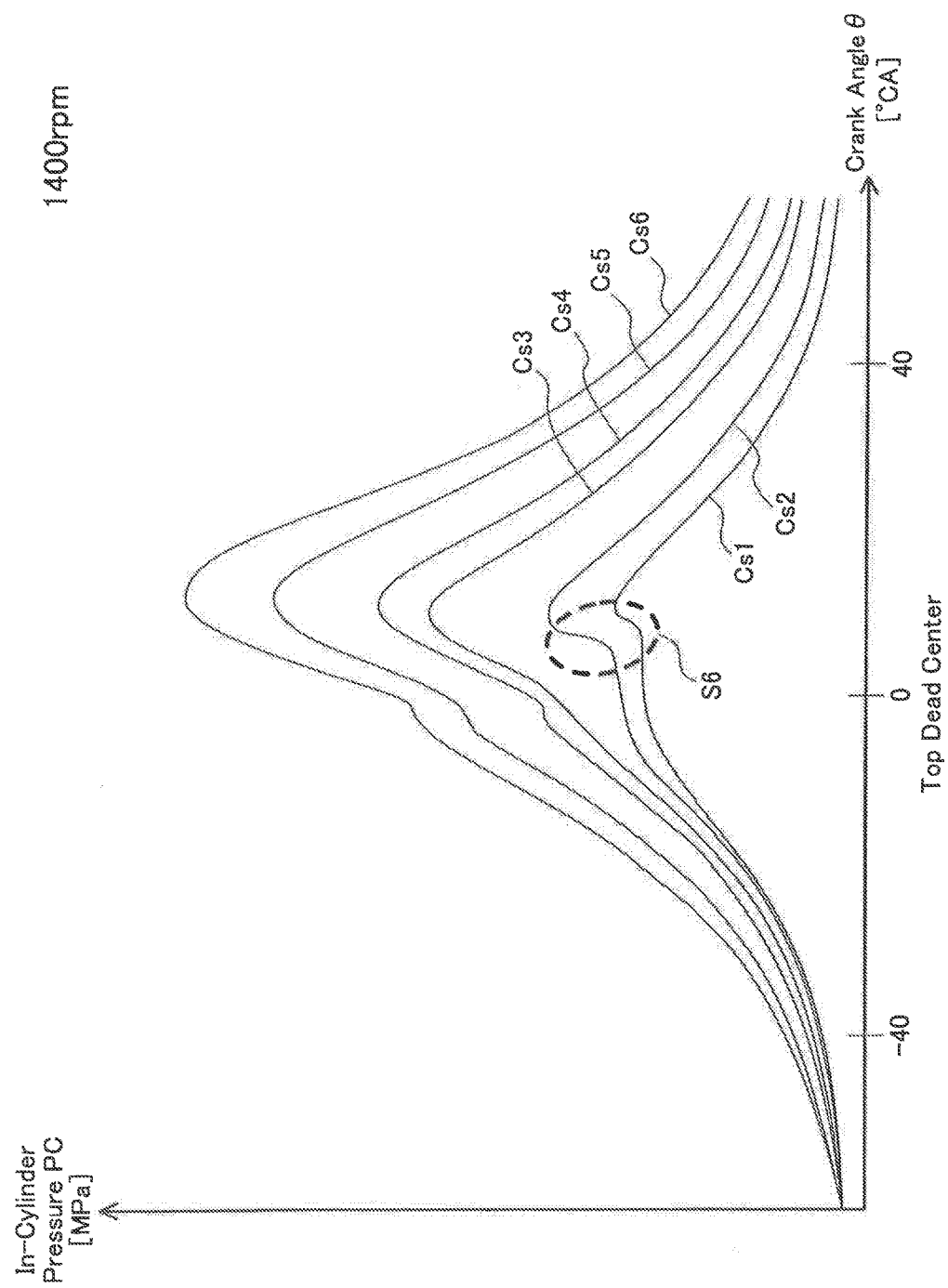
FIG. 6 is a graph showing changes of a in-cylinder pressure with respect to crank angles for each of various engine loads in a case in which a rotational speed is low.

In contrast, FIG. 6 shows the measured result when the rotational speed NE is 1400 revolutions per minute. The curved lines from Cs1 through Cs6, shown in FIG. 6, represent the change of the in-cylinder pressure Pc with respect to the crank angle θ for each of the engine load KL of the engine 10. The curved line Cs1 represents the in-cylinder pressure Pc when the engine load KL is minimum. The engine load KL becomes higher in order of the curved line Cs2, Cs3, . . . , and the curved line Cs6 represents the in-cylinder pressure Pc when the engine load KL is maximum. In a portion of the curved line Cs1 and the curved line Cs2, the portion being surrounded by the area S6, a gradient of the in-cylinder pressure waveform is large/steep.

Meanwhile, if the rotational speed NE is/remains constant, a change amount of the crank angle θ per unit time is also constant, and therefore, the increased amount "per unit time" of the in-cylinder pressure Pc becomes larger as the positive gradient of the in-cylinder pressure waveform shown in FIG. 5 and FIG. 6 becomes higher (that is, as the increased amount "per unit crank angle" of the in-cylinder pressure Pc becomes larger). In addition, since a volume of the combustion noise correlates with the increased amount per unit time of the in-cylinder pressure Pc (i.e., the in-cylinder pressure increasing rate), the combustion noise becomes larger as the positive gradient of the in-cylinder pressure waveform becomes higher. That is, in the area S6 shown in FIG. 6, an increase in combustion noise occurs.

The inventors studied/analyzed a cause of this increase in noise. As a result, the inventors found (acquired knowledge) that the noise rises (becomes larger) because of an increase in an ignition lag, the increase in the ignition lag occurring when the EGR is executed, an EGR amount is relatively large, and the rotational speed NE or the engine load KL is relatively low. More specifically, the fuel injected by the fuel injection valve 23 does not ignite promptly/immediately, and thus, the fuel spreads in the cylinder 22, when the ignition lag becomes longer. Thereafter, when the fuel ignites, the fuel which has spread starts to combust at a burst, and thereby, the in-cylinder pressure Pc increases drastically (precipitously). It is contemplated/inferred that this is the reason why the increase in the combustion noise occurs.

In view of the above, the inventors further studied/analyzed a cause of the increase in the ignition lag. The result of the study is described below.

(1) While the EGR is being executed, an oxygen concentration in the cylinder 22 becomes lower due to the EGR gas introduced into the cylinder 22 via the exhaust recirculating pipe 61. Thus, the ignition lag becomes longer.

(2) In addition, in a case in which the rotational speed NE is low, an amount of the air introduced into the cylinder 22 (the mass flow rate) becomes lower, compared to a case in which the rotational speed NE is high. Thus, the ignition lag becomes longer.

(3) In a case in which the engine load KL is low, an amount of the fuel injected from the fuel injection valve 23 into the cylinder 22 becomes lower, compared to a case in which the engine load KL is high. Thus, the ignition lag becomes longer.

In the present specification, a condition where the ignition lag is likely to become longer is referred to as a "specific condition." That is, the specific condition is a condition which is satisfied when "the EGR is in execution (being executed), and the rotational speed NE or the engine load KL is low."

<Specific Control>

Based on the knowledge/view described above, the first apparatus executes/performs a specific control (a Noise Increasing Prevention Control) in place of the Barycentric Position Control, in order to prevent an increase in the combustion noise when the specific condition is satisfied. More specifically, when there is a possibility (it is likely) that the combustion noise becomes louder, the first apparatus increases the supercharging pressure Tp by a predetermined amount, compared to a case in which the Barycentric Position Control is executed. Because an amount of air introduced into the cylinder 22 is increased, and thus, the temperature of the cylinder 22 is raised by the increase in the supercharging pressure Tp, the fuel injected by the fuel injection valve 23 ignites readily, and therefore, the increase in the ignition lag can be prevented.

Figure 7:
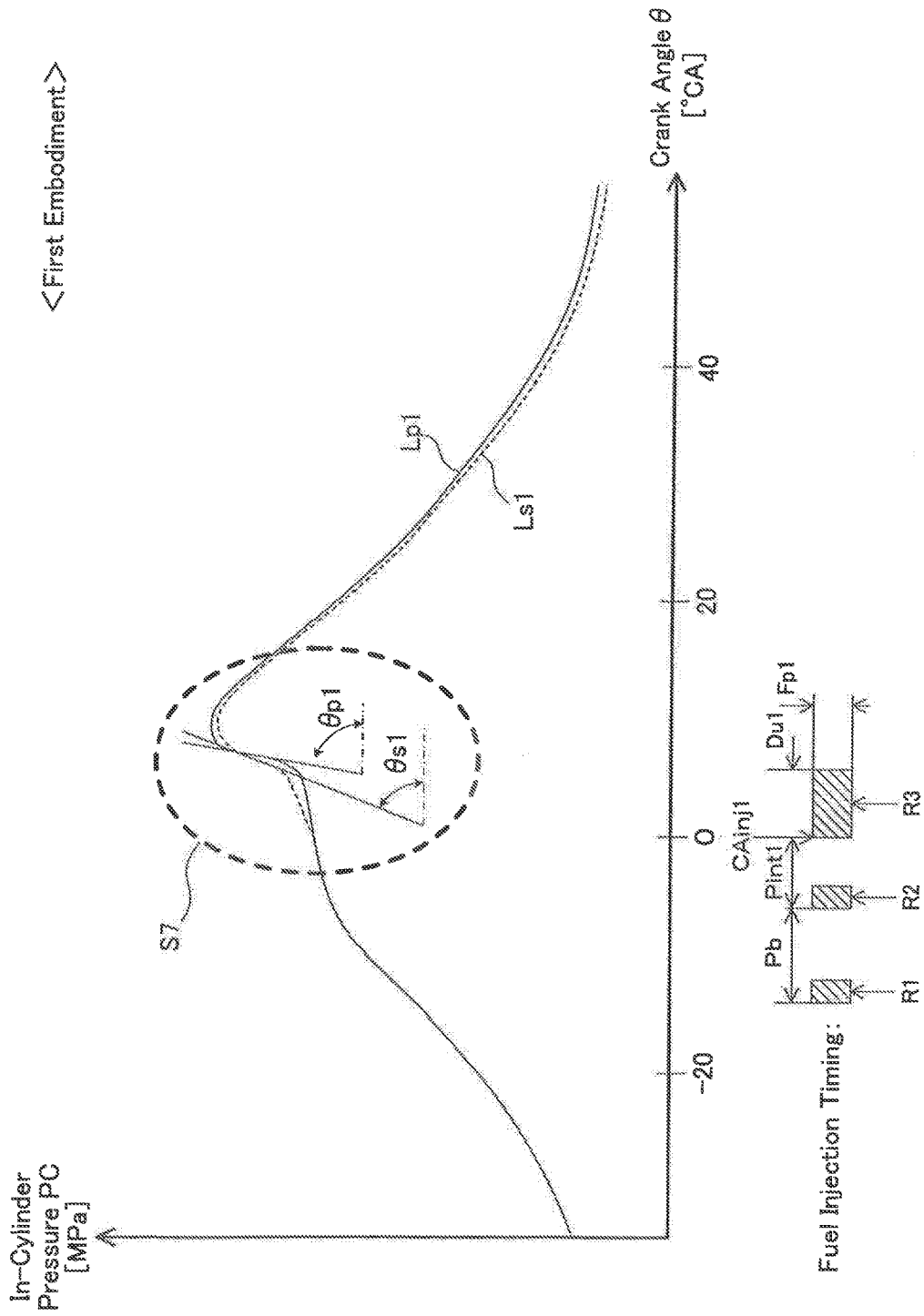
FIG. 7 is a graph showing relationships between a crank angle and an in-cylinder pressure in a case where the first apparatus executes a Noise Increasing Prevention Control and in a case where it does not execute the control.

FIG. 7 shows in-cylinder pressure waveforms in a case where the combustion noise increasing occurs during the Barycentric Position Control, and in a case where the combustion noise increasing is prevented by the Noise Increasing Prevention Control. The curved line Lp1 shown in FIG. 7 is the same in-cylinder pressure waveform as the curved line Cs2 shown in FIG. 6, and represents a change of the in-cylinder pressure Pc with respect to the crank angle θ in the case where the combustion noise increasing occurs due to the increase in the ignition lag. In contrast, the curved line Ls1 represents a change of the in-cylinder pressure Pc with respect to the crank angle θ in a case where the first apparatus executes/performs the Noise Increasing Prevention Control.

In addition, the fuel injections by the fuel injection valve 23 are represented/illustrated by the rectangle R1 through R3 beneath the in-cylinder pressure waveforms in FIG. 7. In the present example, two pilot injections and one main injection are executed for each cycle. The rectangles from R1 to R3 correspond to the first pilot injection, the second pilot injection, and the main injection, respectively. Each of the rectangles from R1 to R3 represents an injection initiation/start timing of the fuel injection, a fuel injection period, and the fuel injection pressure Fp (that is, the injection initiation/start timing of the fuel injection is represented by a position of the left side of each of the rectangles (refer to, for example, the main fuel injection initiation timing CAinj1 shown by the rectangle R3), the fuel injection period is represented by the horizontal length of each of the rectangles (refer to, for example, the fuel injection period Du1 shown by the rectangle R3), and the fuel injection pressure Fp is represented by the vertically length of each of the rectangles (refer to, for example, the fuel injection pressure Fp1 shown by the rectangle R3).

As shown in a part of the curved line Lp1 in the area S7, the main injection is executed when the crank angle θ reaches the main fuel injection timing CAinj, and thereafter, the in-cylinder pressure Pc increases precipitously/drastically. During that time, the maximum value of the increased amount of the in-cylinder pressure Pc per unit time (that is, the in-cylinder pressure increasing rate) is θp1. In contrast, as shown by the curved line Ls1, the fuel injected by the main injection starts to combust earlier, and thereby, the in-cylinder pressure Pc starts to increase earlier, compared to the curved line Lp1. This is because that the supercharging pressure Tp is increased by the Noise Increasing Prevention Control, and thereby, the oxygen amount in the cylinder 22 is increased, and the temperature in the cylinder 22 is increased.

That is, by the Noise Increasing Prevention Control, the ignition lag is shortened compared to a case where the Noise Increasing Prevention Control is not performed. As a result, the increase in the in-cylinder pressure Pc at the beginning of a main combustion becomes more gradual (slower, milder) compared to the case where the Noise Increasing Prevention Control is not executed, the maximum value θs1 of the increased amount of the in-cylinder pressure Pc per unit time becomes smaller than the value θp1 (θp1>θs1). Accordingly, the increase in the combustion noise is suppressed.

<Combustion Parameter Setting Process>

A process (combustion parameter setting process) which the CPU 75 of the ECU 70 (hereinafter, simply referred to as a "CPU") executes in order to control the combustion state in the cylinder 22 will next be described with reference to the flowchart of FIG. 8. In this process, the CPU sets the combustion parameters such that the Heat Release Rate Barycentric Position Gc becomes equal to (coincide with) the Target Barycentric Position Gc*. That is, the CPU executes/performs the Barycentric Position Control. However, in a case where there is a possibility that the combustion noise becomes louder (that is, the specific condition is satisfied), the CPU increases the supercharging pressure Tp, as described above. That is, in this case, the CPU executes/performs the Noise Increasing Prevention Control. The specific condition is satisfied when the EGR is in execution (that is, the valve opening ratio Er>0), and, the rotational speed NE is lower than the rotational speed threshold NEth or the engine load KL is lower than the load threshold KLth.

It is assumed that the specific condition is not satisfied. That is, it is assumed that at least one of the followings (a) and (b) are satisfied, (a) the EGR is not in execution (that is, the valve opening ratio Er=0), and (b) the rotational speed NE is greater than or equal to the rotational speed threshold NEth and the engine load KL is greater than or equal to the load threshold KLth.

In this case, there is no/little possibility that the increase in combustion noise occurs.

When the engine 10 is being operated, the CPU starts processing every elapse of a predetermined time from step 800 and proceeds to step 805. At step 805, the CPU determines an engine required output power Pr based on the accelerator opening degree Ap and the traveling speed Vs. More specifically, the CPU sets the engine required output power Pr such that the power Pr becomes larger as the accelerator opening degree Ap becomes higher, and the power Pr becomes larger as the traveling speed Vs becomes higher.

Subsequently, the CPU proceeds to step 810 to determine a required injection amount tau to be needed so as to generate the engine required output power Pr. More specifically, the CPU sets the required injection amount tau such that the amount tau becomes larger as the engine required output power Pr becomes higher.

Subsequently, the CPU proceeds to step 815 to determine a ratio (pilot injection ratio) $\alpha$ ($0 \leq \alpha < 1$) of a fuel injection amount by the pilot injection to the required injection amount tau. That is, the CPU twice injects the fuel in an amount calculated according to $0.5 \times \alpha \times tau$ by the pilot injections, and injects the fuel in an amount calculated by $(1-\alpha) \times tau$ by the main injection. The ratio $\alpha$ is set/determined based on the coolant water temperature THW, the rotational speed NE, and so on.

Subsequently, the CPU proceeds to step 820 to determine the fuel injection pressure Fp. More specifically, the CPU sets the fuel injection pressure Fp such that the pressure Fp becomes higher as the engine required output power Pr becomes larger.

Subsequently, the CPU proceeds to step 825 to determine the supercharging pressure Tp. More specifically, the CPU sets the supercharging pressure Tp such that the pressure Tp becomes higher as the engine required output power Pr becomes larger.

Thereafter, the CPU proceeds to step 830 to determine the valve opening ratio Er of the EGR control valve 62 based on the rotational speed NE and the engine load KL. Next, the CPU proceeds to step 835 to determine the pilot interval Pint.

Subsequently, the CPU proceeds to step 840 to determine the main fuel injection timing CAinj. More specifically, the main fuel injection timing CAinj depending on (corresponding to) "the engine required output power Pr, the required injection amount tau, the pilot injection ratio $\alpha$, the fuel injection pressure Fp, the supercharging pressure Tp, the EGR valve opening ratio Er, and the pilot interval Pint" is determined in advance according to experiments or the like such that the Heat Release Rate Barycentric Position Gc becomes equal to (coincides with) the Target Barycentric Position Gc*. The main fuel injection timing CAinj is stored in the ROM 76 in a form of a map. That is, the CPU determines the main fuel injection timing CAinj by referring to the map such that the engine 10 generates an output power equal to the engine required output power Pr, and the Heat Release Rate Barycentric Position Gc becomes equal to (coincides with) the Target Barycentric Position Gc*.

It should be noted that an actual fuel injection using the fuel injection valve 23 is executed by an unillustrated routine. Accordingly, the first pilot injection is initiated/started when the crank angle $\theta$ of each cylinder 22 reaches a crank angle which is on the advance side by a sum of the pilot interval Pint and a predetermined (constant) value Pb from (with respect to) the main fuel injection timing CAinj (that is, $\theta = CAinj - Pint - Pb$). Thereafter, the second pilot injection is initiated/started when the crank angle $\theta$ reaches a crank angle which is on the retard side by the predetermined value Pb (that is, $\theta = CAinj - Pint$), and then, the main injection is initiated/started when the crank angle $\theta$ reaches a crank angle equal to the main fuel injection timing CAinj (that is, $\theta = CAinj$).

Subsequently, the CPU proceeds to step 845 to determine whether or not the specific condition is satisfied. According to the assumption described above, the specific condition is not satisfied, and thus, the CPU makes a "No" determination at step 845 to directly proceed to step 895, at which the CPU ends the present routine tentatively. As a result, the Barycentric Position Control is executed.

It should be noted that, the CPU executes an unillustrated routine so as to control each of the various actuators based on each of the combustion parameters that are set in the present routine. For example, the CPU controls the fuel pressurization pump 31 based on the output signal from the fuel pressure sensor 84 such that the pressure Ep in the accumulator 33 becomes equal to a value which corresponds to the fuel injection pressure Fp. In addition, the CPU controls the supercharger 44 based on the output signal from the intake pipe pressure sensor 83 such that the pressure Pm in the intake manifold 41 becomes equal to a value which corresponds to the supercharging pressure Tp. Further, the CPU controls the EGR control valve 62 based on the output signal from the EGR control valve opening sensor 87 such that its valve opening ratio becomes equal to Er.

Next, it is assumed that the specific condition is satisfied. That is, it is assumed that both of the followings (a') and (b') are satisfied:
(a') the EGR is in execution (that is, the valve opening ratio Er>0); and
(b') the rotational speed NE is lower than the rotational speed threshold NEth or the engine load KL is smaller than the load threshold KLth.

In this case, there is a possibility (it is likely) that the increase in the combustion noise occurs. Unlike the case described above, the CPU makes a "Yes" determination at step 845 to proceed to step 850, according to this assumption.

At step 850, the CPU sets the supercharging pressure Tp to/at a value higher by $\Delta Tp$ than the value determined at step 825. That is, the supercharging pressure Tp is set to be higher by $\Delta Tp$ compared to the case where the specific condition is not satisfied. Subsequently, the CPU proceeds to step 895 to end the present routine tentatively. As a result, the specific control is executed.

Figure 8:
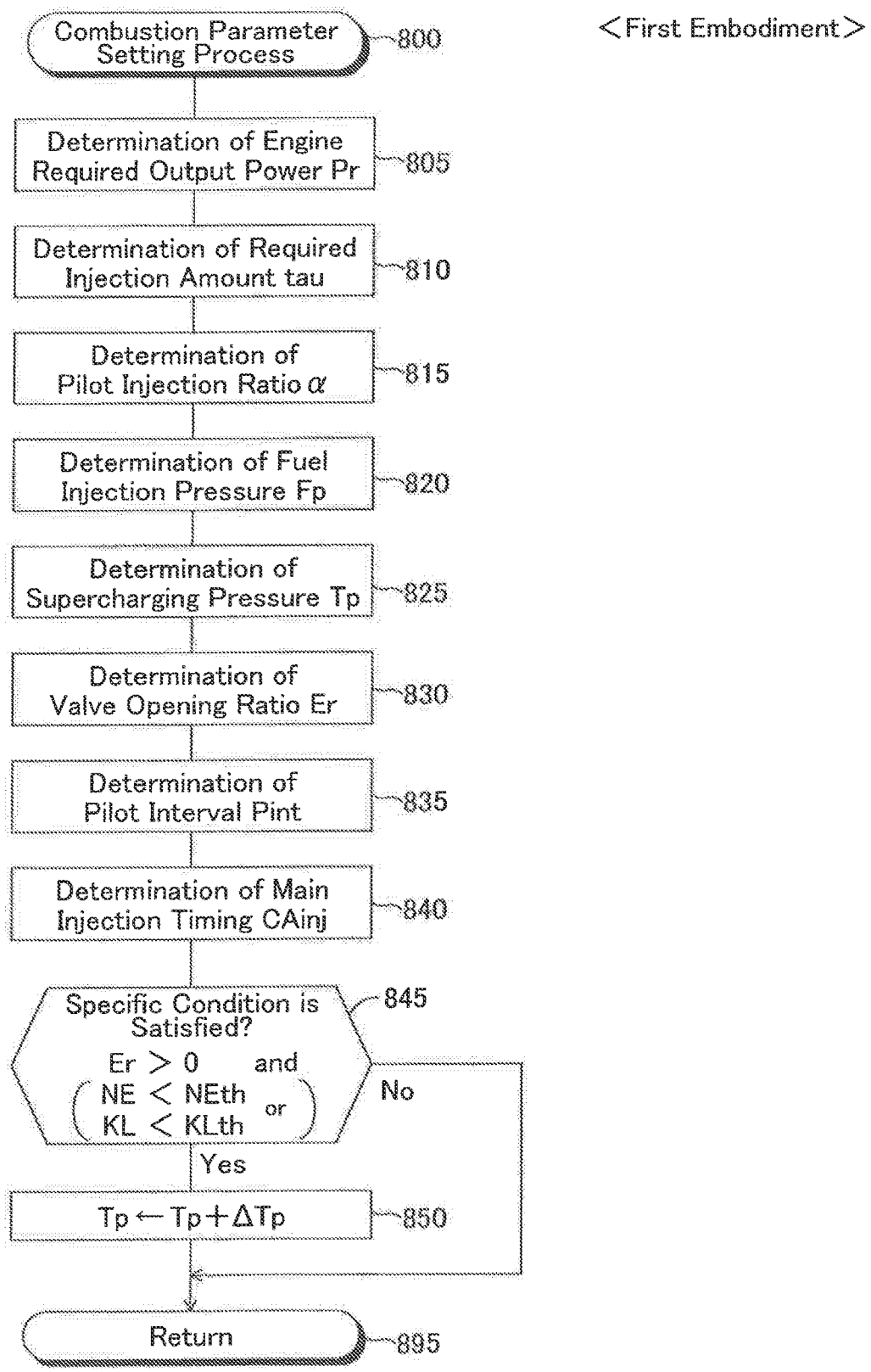
FIG. 8 is a flowchart showing a combustion parameter setting process which the first apparatus executes.

As described above, the first apparatus according to the first embodiment is an engine control apparatus (ECU70) applied to an internal combustion engine (10) having an EGR apparatus (EGR system 60), the engine control apparatus comprising a control section which sets combustion parameter which controls a combustion state of the engine, wherein, the control section is configured to:

execute a Barycentric Position Control to set the combustion parameter (step 810 to step 840, shown in FIG. 8) such that a Heat Release Rate Barycentric Position (Gc) which represents the combustion state becomes equal to a constant reference crank angle (Target Barycentric Position Gc*), when the engine is in a predetermined operational state ("No" determination at step 845, shown in FIG. 8); and, execute, in place of the Barycentric Position Control, a specific control to set the combustion parameter (step 850, shown in FIG. 8) such that a maximum value of an increased amount per unit time of a in-cylinder pressure is lower than a maximum value of the increased amount of the in-cylinder pressure while the Barycentric Position Control is in execution, when an EGR is in execution, and, a load of the engine is lower than a predetermined load threshold or a rotational speed of the engine is lower than a predetermined rotational speed threshold ("Yes" determination at step 845, shown in FIG. 8).

Additionally, the control section executes a control, as the specific control, which shortens a time required for a fuel injected into the cylinder to ignite so as to start to be combusted (step 850, shown in FIG. 8).

Additionally, the engine (10) comprises a supercharger (44), and, the control section is configured to execute, as the specific control, a control to increase a supercharging pressure serving as the combustion parameter (step 850, shown in FIG. 8).

Thus, the first apparatus can suppress the increase in the combustion noise by preventing the ignition lag of the fuel injected into the cylinder 22 from the fuel injection valve 23 from increasing.

Second Embodiment

Next, a control apparatus for an internal combustion engine (hereinafter, referred to as a "second apparatus") according to a second embodiment of the present invention will be described. The first apparatus executes the control which increases the supercharging pressure Tp as the Noise Increasing Prevention Control. In contrast, the second apparatus is different from the first apparatus only in that the second apparatus executes a control which extends a time (period) from the pilot injection which is executed just prior to the main injection to the main injection, as the Noise Increasing Prevention Control. Hereinafter, the difference will be mainly described.

Figure 9:
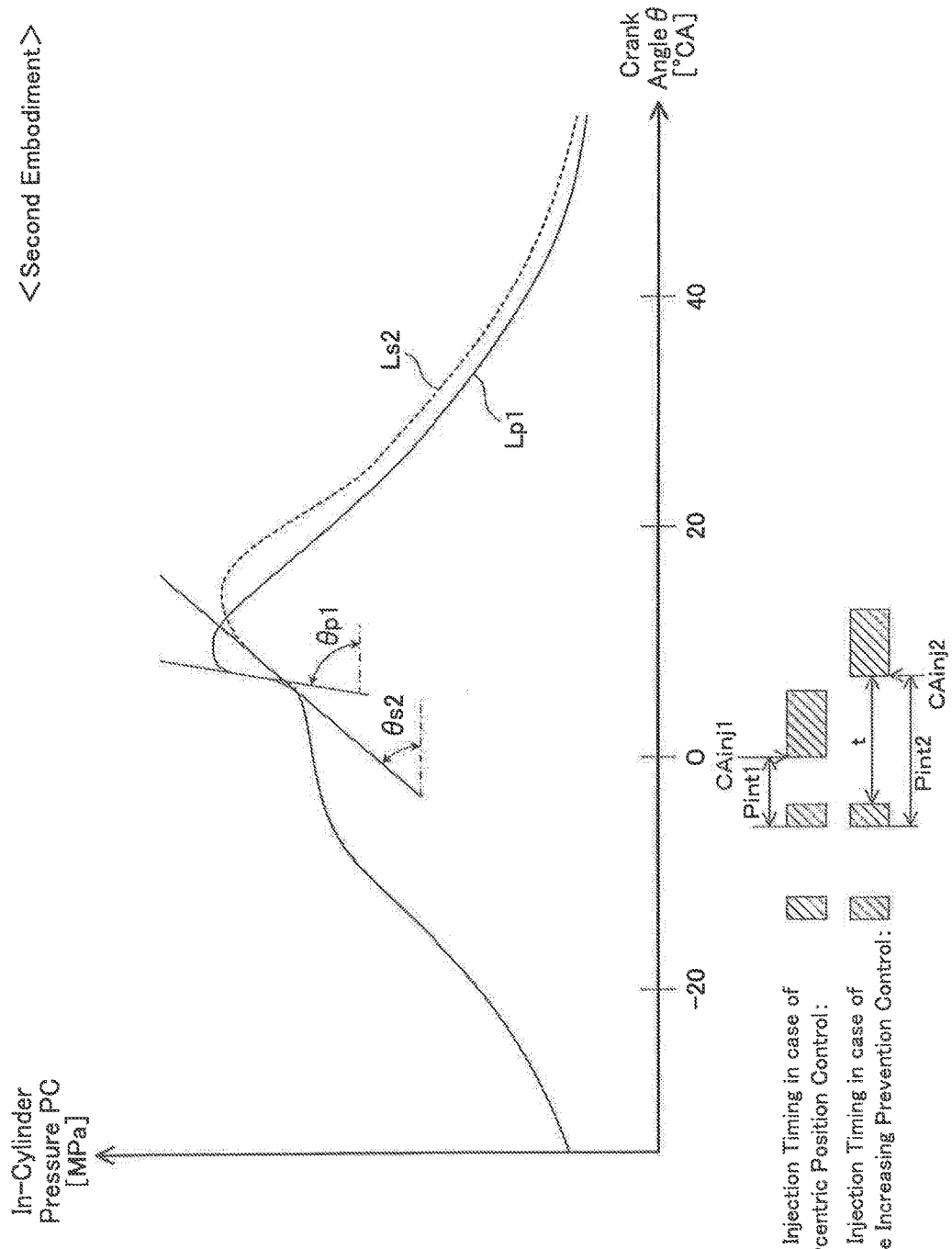
FIG. 9 is a graph showing relationships between a crank angle and an in-cylinder pressure in a case where a control apparatus (second apparatus) according to a second embodiment of the present invention executes the Noise Increasing Prevention Control and in a case where it does not execute the control.

A change of the in-cylinder pressure Pc with respect to the crank angle θ when an ECU 71 of the second apparatus performs/executes the Noise Increasing Prevention Control will be described with reference to FIG. 9. FIG. 9, similarly to FIG. 7, represents the change of the in-cylinder pressure Pc with respect to the crank angle θ using the in-cylinder pressure waveform. The curved line Ls2 is the in-cylinder pressure waveform when the ECU71 performs/executes the Noise Increasing Prevention Control.

When there is a possibility (or it is likely) that the increase in combustion noise occurs (that is, when the specific condition is satisfied), the second apparatus sets the pilot interval Pint to/at an "interval Pint2 which is longer than the pilot interval Pint1 used when the Barycentric Position Control is executed by 7° CA, in order to execute, as the Noise Increasing Prevention Control (the specific control), a control for extending a time (period) from a end point in time of the pilot injection executed immediately before the main injection to a start point in time of the main injection. The pilot interval Pint is a time period corresponding to Pint1 and Pint2 shown in FIG. 9, and a time (period) from the end point in time of the pilot injection executed immediately before (just prior to) the main injection to the start point in time of the main injection. The second apparatus sets the main fuel injection timing CAinj to/at a "timing CAinj2 which is retarded from the timing CAinj1 used when the Barycentric Position Control is executed by 7° CA" so as to realize the extension of the pilot interval Pint.

On the other hand, the second apparatus does not change the required injection amount tau and the fuel injection pressure Fp depending on which is executed, the Barycentric Position Control or the Noise Increasing Prevention Control. Therefore, both of the pilot injection period and the main injection period do not change. Thus, as a result of the extension of the pilot interval Pint, a time period t from the end point in time of the pilot injection executed immediately before (just prior to) the main injection to the start point in time of the main injection is extended.

As a result, a period when an "amount of heat generated per unit time by the combustion of the fuel by the main injection" is high occurs after a period when an "amount of heat generated per unit time by the combustion of the fuel by the pilot injection" is high elapses. Thus, a period when a "sum of these heats" is very high does not occur. In addition, a temperature in the cylinder 22 is raised by the combustion of the fuel injected by the pilot injection, and therefore, the fuel injected by the main injection starts to ignite promptly. From the above reasons, a rapid increase in the in-cylinder pressure Pc is suppressed.

As understood from the curve Lp1, in a case where the second apparatus does not execute the Noise Increasing Prevention Control (that is, in the case where the second apparatus executes the Barycentric Position Control), the in-cylinder pressure Pc increases rapidly when a period corresponding to the ignition lag elapses after the main injection is started/initiated. In contrast, as understood from the curved line Ls2, in a case where the second apparatus executes the Noise Increasing Prevention Control, the fuel injected by the main injection starts to combust promptly (immediately after the injection), and thus, the increase in the in-cylinder pressure Pc (owing to the combustion of that injected fuel) becomes gradual (slow, mild), compared to the curved line Lp1. Accordingly, the suppression of the rapid increase in the in-cylinder pressure Pc allows/enables the maximum value θs2 of the in-cylinder pressure increasing rate to be smaller than θp1 (that is, θp1>θs2).

Next, a combustion parameter setting process which the CPU 75 of the ECU 71 (hereinafter, simply referred to as a "CPU") executes will be described with reference to the flowchart shown in FIG. 10. Each step shown in FIG. 10 at which the same processing is performed as each step shown in FIG. 8 is given the same step symbol as one given to such step shown in FIG. 8. The CPU starts processing every elapse of a predetermined time from step 1000, executes processes of steps from step 805 to step 840, and proceeds to step 845.

When the CPU makes a "Yes" determination at step 845 (that is, the specific condition is satisfied), it proceeds to step 1050. In this case, there is a possibility (it is likely) that the increase in the combustion noise occurs.

At step 1050, the CPU sets the pilot interval Pint to/at a value which is longer than the pilot interval Pint set at step 835 by ΔPint. As a result, the pilot interval Pint is lengthen (extended) by ΔPint. Further, the CPU sets the main fuel injection timing CAinj to/at a value which is larger than the main fuel injection timing CAinj set at step 840 by ΔCAinj. As a result, the main fuel injection timing CAinj is retarded by ΔCAinj. Subsequently, the CPU proceeds to step 1095 to end the present routine tentatively. As a result, the specific control is executed.

On the other hand, when the CPU makes a "No" determination at step 845 (that is, the specific condition is not satisfied), it directly proceeds to step 1095. As a result, the Barycentric Position Control is executed.

Figure 10:
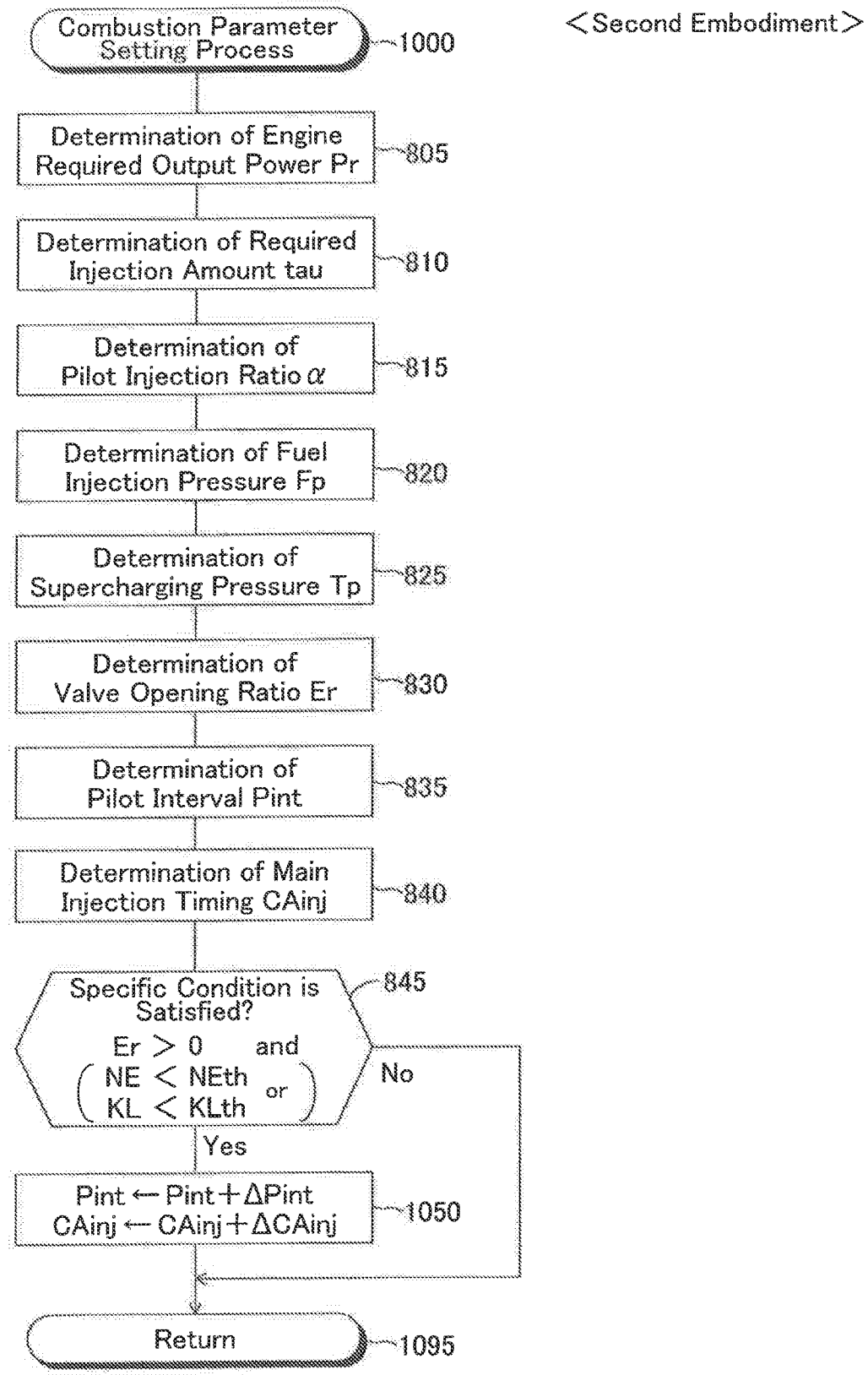
FIG. 10 is a flowchart showing a combustion parameter setting process which the second apparatus executes.

As described above, the control section (ECU71) of the second apparatus is configured to execute, as the specific control, a control to extend a time from a pilot injection executed immediately before a main injection to the main injection (step 1050, shown in FIG. 10).

Additionally, the control section is configured to execute a control to retard an injection timing of the main injection serving as the combustion parameter as the specific control (the retard of the main fuel injection timing CAinj at step 1050 shown in FIG. 10).

It should be noted that the control section may be configured to execute a control to advance an injection timing of the pilot injection serving as the combustion parameter as the specific control. Moreover, the control section may be configured to execute both of the control to advance an injection timing of the pilot injection serving as the combustion parameter and the control to retard an injection timing of the main injection serving as the combustion parameter, as the specific control.

According to the second apparatus, the combustion noise can be suppressed by extending the time period from the pilot injection executed immediately before (just prior to) the main injection to the main injection (that is, by extending the time period from the end point in time of the pilot injection to the start point in time of the main injection).

Third Embodiment

Next, a control apparatus for an internal combustion engine (hereinafter, referred to as a "third apparatus") according to a third embodiment of the present invention will be described. The second apparatus described above performs/executes the control which extends the pilot interval Pint, as the Noise Increasing Prevention Control. In contrast, the third apparatus is different from the second apparatus only in that the third apparatus does not change the pilot interval Pint, however, it executes, as the Noise Increasing Prevention Control, a control which retards the main fuel injection timing CAinj. Hereinafter, the difference will be mainly described.

Figure 11:
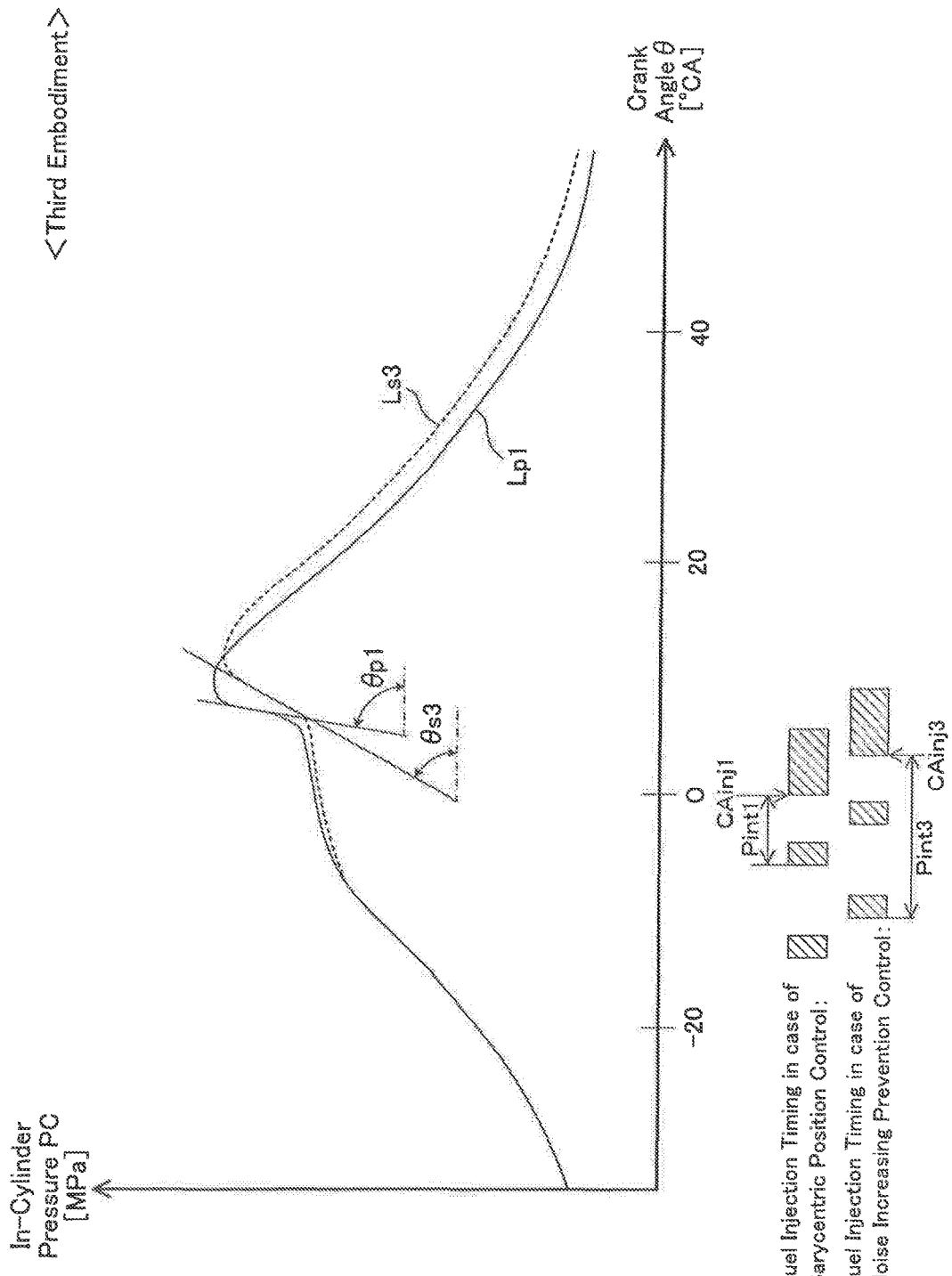
FIG. 11 is a graph showing relationships between a crank angle and an in-cylinder pressure in a case where a control apparatus (third apparatus) according to a third embodiment of the present invention executes the Noise Increasing Prevention Control and in a case where it does not execute the control.

A change of the in-cylinder pressure Pc with respect to the crank angle θ when an ECU 72 of the third apparatus executes the Noise Increasing Prevention Control will be described with reference to FIG. 11. FIG. 11, similarly to FIG. 7, shows the change of the in-cylinder pressure Pc with respect to the crank angle θ by the in-cylinder pressure waveform. The curved line Ls3 is the in-cylinder pressure waveform when the ECU72 executes the Noise Increasing Prevention Control.

In a case where the main injection start/initiation timing is retarded by the Noise Increasing Prevention Control, a piston reaches a more downward position when the main injection is started, compared to a case where the Noise Increasing Prevention Control is not executed. Moving-down of the piston means that a position of the piston comes closer to the bottom dead center. Thus, according to the third apparatus, the main injection is executed (at the timing) when a combustion chamber volume in the cylinder 22 becomes larger. Further, the main injection is executed when the position of the piston is between the compression top dead center and 90° after the compression top dead center regardless of whether or not the Noise Increasing Prevention Control is executed, and thus, a combustion chamber volume increasing rate at the time of the execution of the main injection is higher when the Noise Increasing Prevention Control is executed (than when the Control is not executed).

As result, as shown by the curved line Ls3, the increase of the in-cylinder pressure Pc at the beginning of the combustion of the fuel injected by the main injection becomes gradual (mild, slow) compared to the curved line Lp1. Therefore, the maximum value θs3 of the in-cylinder pressure increasing rate is smaller than θp1 (that is, θp1>θs3).

Next, a combustion parameter setting process which the CPU 75 of the ECU 72 (hereinafter, simply referred to as a "CPU") executes will be described with reference to the flowchart shown in FIG. 12. Each step shown in FIG. 12 at which the same processing is performed as each step shown in FIG. 8 is given the same step symbol as one given to such step shown in FIG. 8. The CPU starts processing every elapse of a predetermined time from step 1200, executes processes of steps from step 805 to step 840, and proceeds to step 845.

When the CPU makes a "Yes" determination at step 845 (that is, the specific condition is satisfied), it proceeds to step 1250. In this case, there is a possibility (it is likely) that the increase in the combustion noise occurs.

At step 1250, the CPU sets the main fuel injection timing CAinj to/at a value which is larger than the main fuel injection timing CAinj set at step 840 by ΔCAinj. As a result, both of the main injection and the pilot injection are retarded by ΔCAinj. Next, the CPU proceeds to step 1295 to end the present routine tentatively. As a result, the specific control is executed.

On the other hand, when the CPU makes a "No" determination at step 845 (that is, the specific condition is not satisfied), it directly proceeds to 1295. As a result, the Barycentric Position Control is executed.

Figure 12:
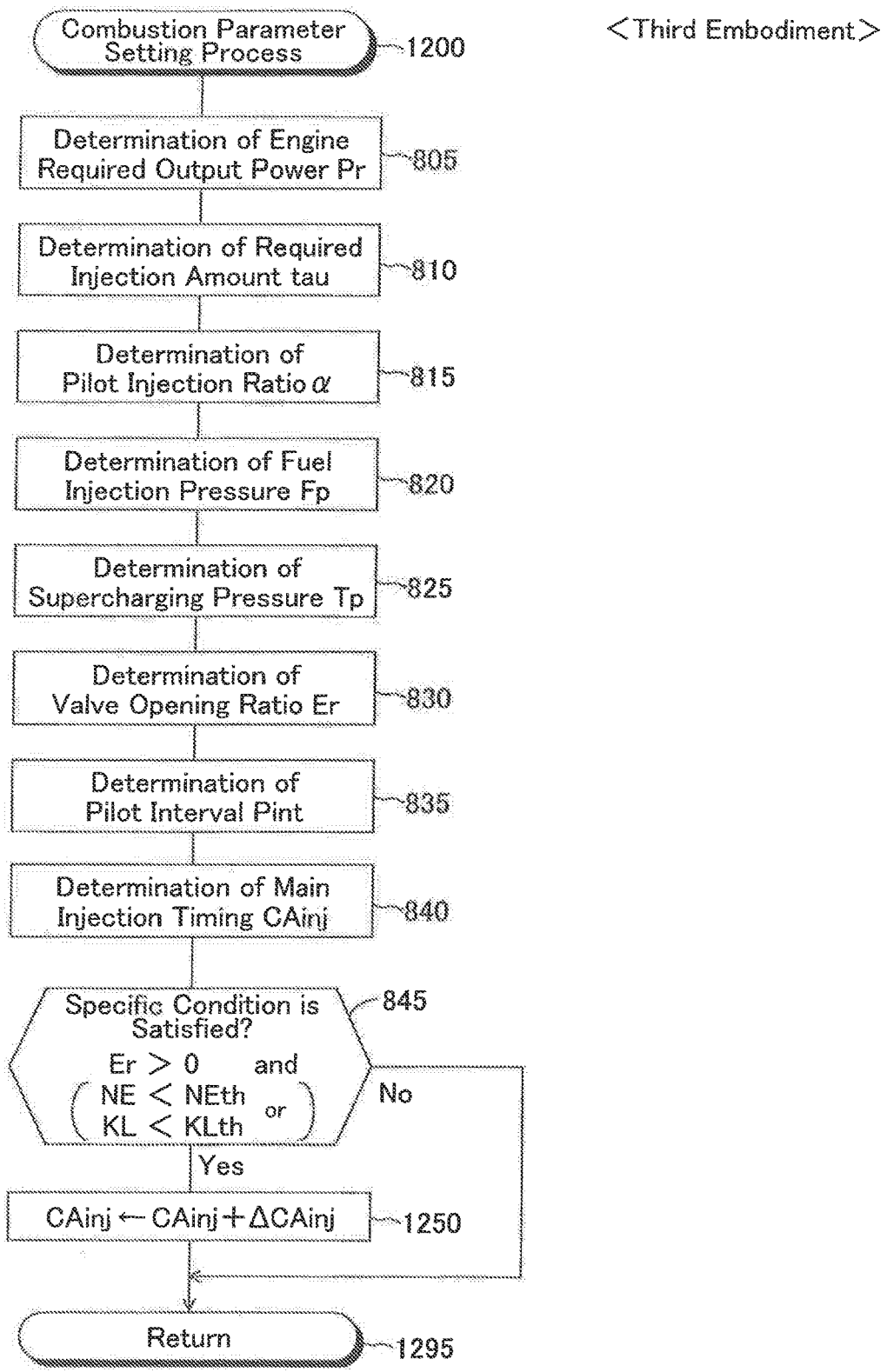
FIG. 12 is a flowchart showing a combustion parameter setting process which the third apparatus executes.

As described above, the control section (ECU72) of the third apparatus according to the third embodiment executes, as the specific control, a control which increases a combustion chamber volume increasing rate at a point in time of combustion start of the fuel injected by the main injection (step 1250, show in FIG. 12).

Additionally, the control section is configured to execute, as the specific control, a control to retard an injection timing of a main injection serving as the combustion parameter (step 1250, show in FIG. 12).

According to the third apparatus, the combustion chamber volume increasing rate at the beginning of the combustion of the fuel injected by the main injection becomes higher, and therefore, the combustion noise can be suppressed.

Forth Embodiment

Next, a control apparatus for an internal combustion engine (hereinafter, referred to as a "forth apparatus") according to a forth embodiment of the present invention will be described. The first apparatus executes the control which increases the supercharging pressure Tp, as the Noise Increasing Prevention Control. In contrast, the forth apparatus is different from the first apparatus only in that the forth apparatus executes, as the Noise Increasing Prevention Control, a control which decreases the fuel injection pressure Fp. Hereinafter, the difference will be mainly described.

Figure 13:
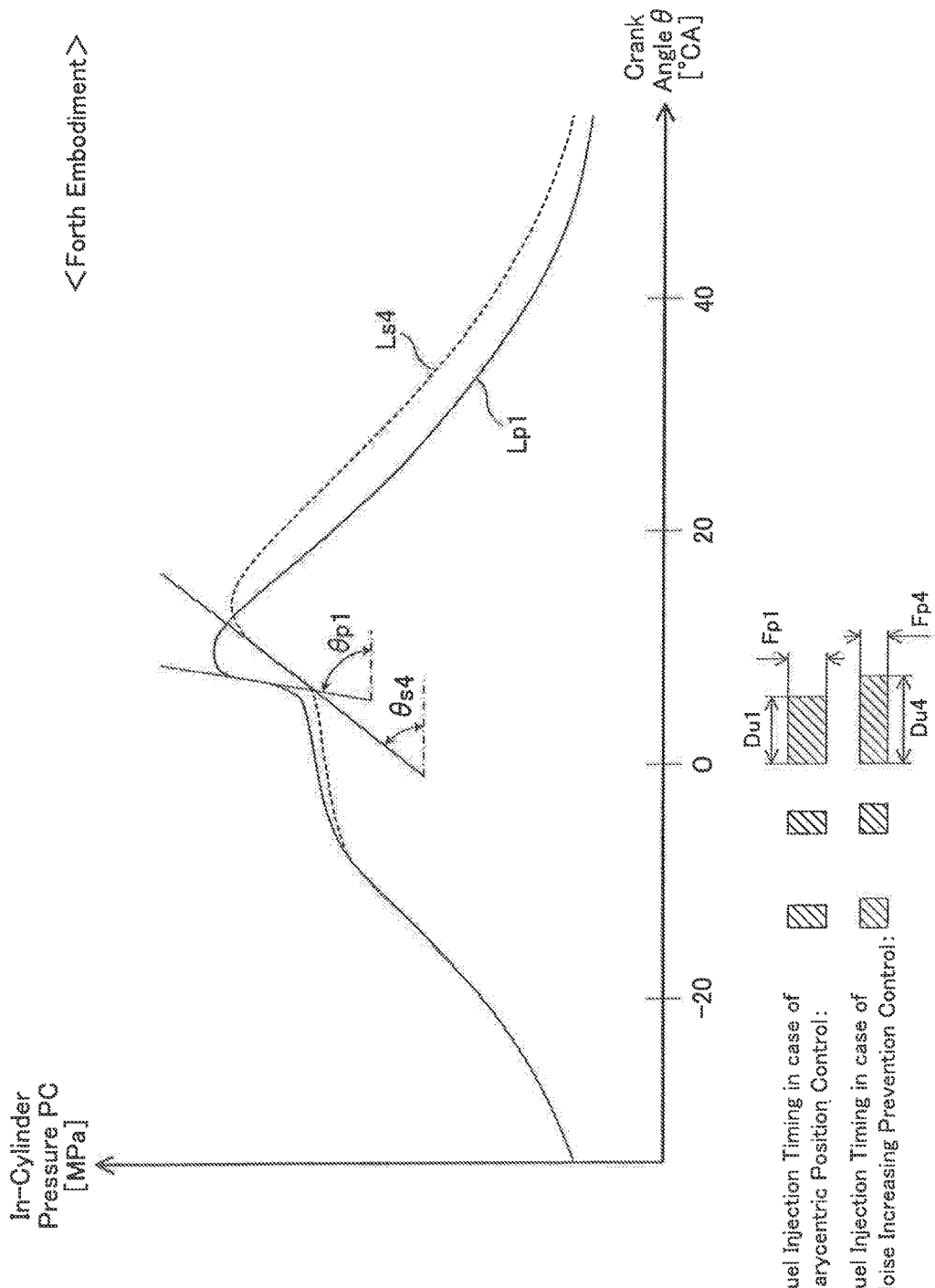
FIG. 13 is a graph showing relationships between a crank angle and an in-cylinder pressure in a case where a control apparatus (forth apparatus) according to a forth embodiment of the present invention execute the Noise Increasing Prevention Control and in a case where it does not execute the control.

A change of the in-cylinder pressure Pc with respect to the crank angle θ when an ECU 73 of the forth apparatus executes/performs the Noise Increasing Prevention Control will be described with reference to FIG. 13. FIG. 13, similarly to FIG. 7, shows the change of the in-cylinder pressure Pc with respect to the crank angle θ by the in-cylinder pressure waveform. The curved line Ls4 is the in-cylinder pressure waveform when the ECU73 executes the Noise Increasing Prevention Control.

In the present example, the fuel injection pressure decreases from Fp1 to Fp4 (that is, Fp1>Fp4) by the Noise Increasing Prevention Control. On the other hand, the fourth apparatus does not change the required injection amount tau depending on which is executed, the Barycentric Position Control or the Noise Increasing Prevention Control. Thus, the forth apparatus extends the fuel injection period (duration) from Du1 to Du4 (that is, Du1<Du4) compared to a case where it does not execute the Noise Increasing Prevention Control.

As a result of the decrease in the fuel injection pressure Fp, a particle diameter of the fuel injected from the fuel injection valve 23 becomes larger, and therefore, a combustion speed becomes lower. Thus, as shown by the curved line Ls4, the increase in the in-cylinder pressure Pc at the beginning of the main combustion becomes gradual (mild, slow) compared to a case where the Noise Increasing Prevention Control is not executed, and therefore, the maximum value θs4 of the in-cylinder pressure increasing rate is smaller than θp1 (that is, θp1>θs4).

Next, a combustion parameter setting process which the CPU 75 of the ECU 73 (hereinafter, simply referred to as a "CPU") executes will be described with reference to the flowchart shown in FIG. 14. Each step in FIG. 14 at which the same processing is performed as each step shown in FIG. 8 is given the same step symbol as one given to such step shown in FIG. 8. The CPU starts processing every elapse of a predetermined time from step 1400, executes processes of steps from step 805 to step 840, and proceeds to step 845.

When the CPU makes a "Yes" determination at step 845 (that is, the specific condition is satisfied), it proceeds to step 1450. In this case, there is a possibility (it is likely) that the increase in combustion noise occurs.

At step 1450, the CPU sets the fuel injection pressure Fp to/at a value which is lower than the fuel injection pressure Fp set at step 820 by ΔFp. As a result, the fuel injection pressure is becomes lower by ΔFp. Next, the CPU proceeds to step 1495 to end the present routine tentatively. As a result, the specific control is executed.

On the other hand, when the CPU makes a "No" determination at step 845 (that is, the specific condition is not satisfied), it directly proceeds to 1495. As a result, the Barycentric Position Control is executed.

Figure 14:
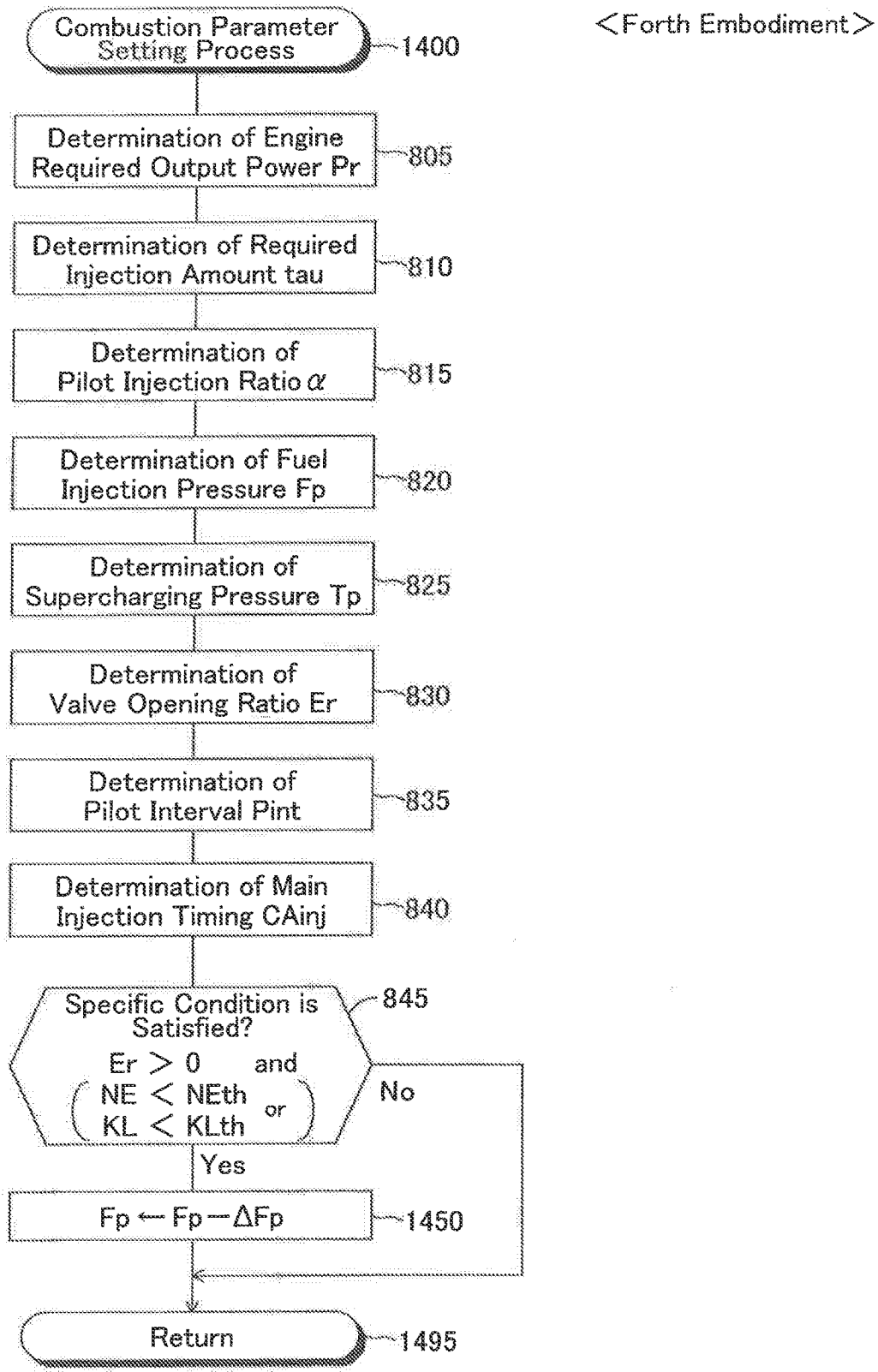
FIG. 14 is a flowchart showing a combustion parameter setting process which the forth apparatus executes.

As described above, the control section (ECU74) of the forth apparatus according to the forth embodiment executes, as the specific control, a control which decreases a combustion speed of the fuel injected by the main injection (step 1450, shown in FIG. 14).

Further, the control section is configured to execute, as the specific control, a control to decrease an injection pressure of a fuel serving as the combustion parameter (step 1450, shown in FIG. 14).

According to the forth apparatus, the combustion speed of the fuel injected by the main injection becomes lower, the combustion noise can be suppressed.

Fifth Embodiment

Next, a control apparatus for an internal combustion engine (hereinafter, referred to as a "fifth apparatus") according to a fifth embodiment of the present invention will be described. The forth apparatus described above does not maintain the Heat Release Rate Barycentric Position Gc at the Target Barycentric Position Gc* in the case where it executes the Noise Increasing Prevention Control. In contrast, the fifth apparatus sets the combustion parameters such that the Heat Release Rate Barycentric Position Gc is maintained at the Target Barycentric Position Gc* even when it executes the Noise Increasing Prevention Control.

More specifically, the fifth apparatus decreases the fuel injection pressure Fp similarly to the forth apparatus, but is different from the forth apparatus only in that the fifth apparatus executes a control which advances the main fuel injection timing CAinj. According to the control described above, the fifth apparatus executes the Noise Increasing Prevention Control while it maintains the Heat Release Rate Barycentric Position Gc at the Target Barycentric Position Gc*. Hereinafter, the difference will be mainly described.

Figure 15:
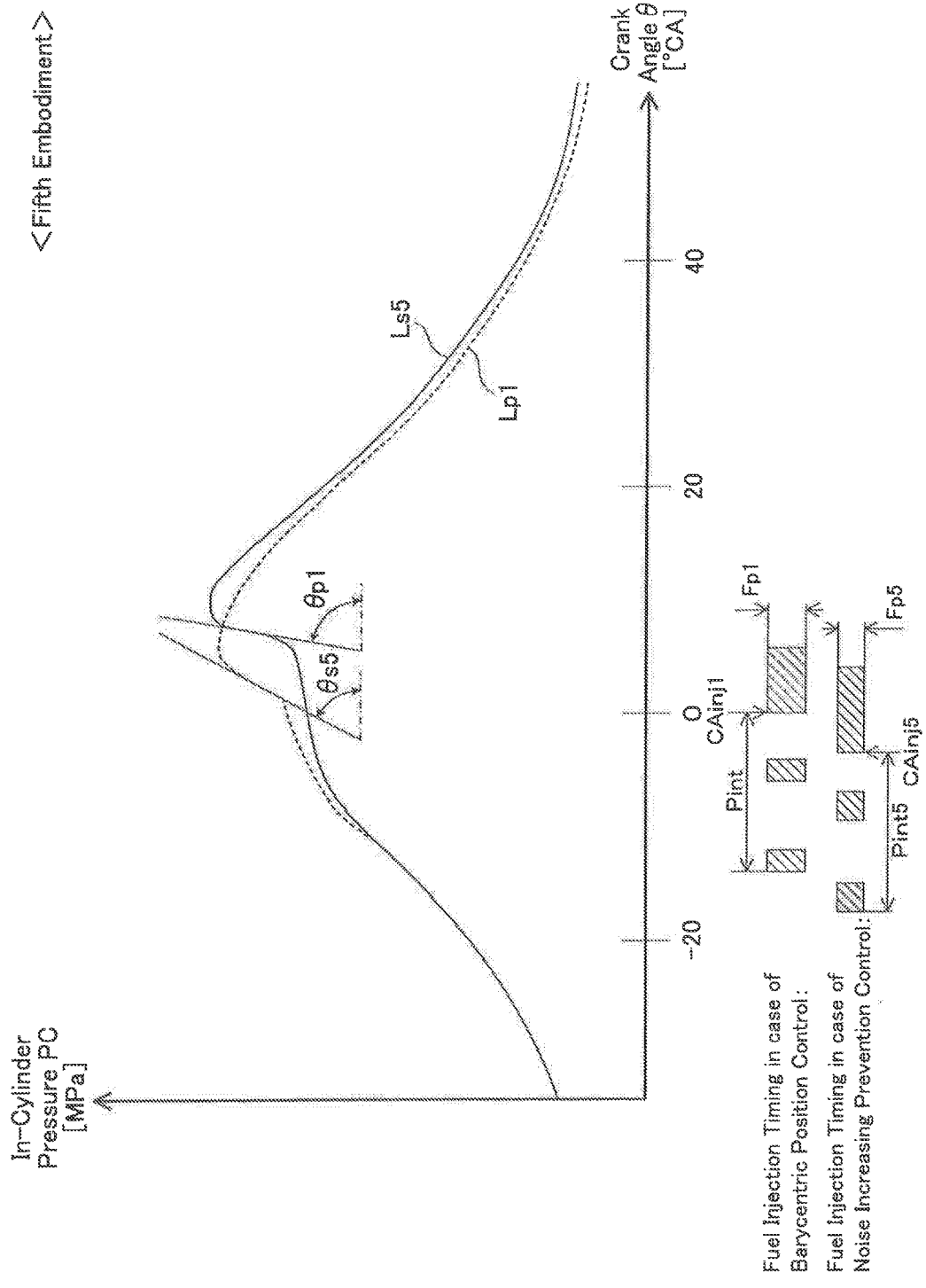
FIG. 15 is a graph showing relationships between a crank angle and an in-cylinder pressure in a case where a control apparatus (fifth apparatus) according to a fifth embodiment of the present invention execute the Noise Increasing Prevention Control and in a case where it does not execute the control.

A change of the in-cylinder pressure Pc with respect to the crank angle θ when an ECU 74 of the fifth apparatus executes the Noise Increasing Prevention Control will be described with reference to FIG. 15. FIG. 15, similarly to FIG. 7, shows the change of the in-cylinder pressure Pc with respect to the crank angle θ by the in-cylinder pressure waveform. The curved line Ls5 is the in-cylinder pressure waveform when the ECU 74 executes the Noise Increasing Prevention Control.

In the present example, the fuel injection pressure Fp decreases from Fp1 to Fp5 (that is, Fp1>Fp5) by the Noise Increasing Prevention Control.

Further, in the present example, the main fuel injection timing CAinj is advanced from CAinj1 to CAinj5 (that is, CAinj1>CAinj5) by the Noise Increasing Prevention Control.

As a result of the decrease in the fuel injection pressure Fp, the particle diameter of the fuel injected from the fuel injection valve 23 becomes larger, and therefore, the combustion speed becomes lower. Thus, the Heat Release Rate Barycentric Position Gc retards (moves to the retard side) with respect to the Target Barycentric Position Gc*. Accordingly, in order to maintain the Heat Release Rate Barycentric Position Gc at the Target Barycentric Position Gc*, the ECU 74 advances the main injection timing from CAinj1 to CAinj5.

Since the fuel injection pressure Fp is decreased (becomes lower), the increase in the in-cylinder pressure Pc at the beginning of the main combustion becomes gradual (mild, slow) compared to a case where the Noise Increasing Prevention Control is not executed. Thus, the maximum value θs5 of the in-cylinder pressure increasing rate is smaller than θp1 (that is, θp1>θs5).

Figure 16:
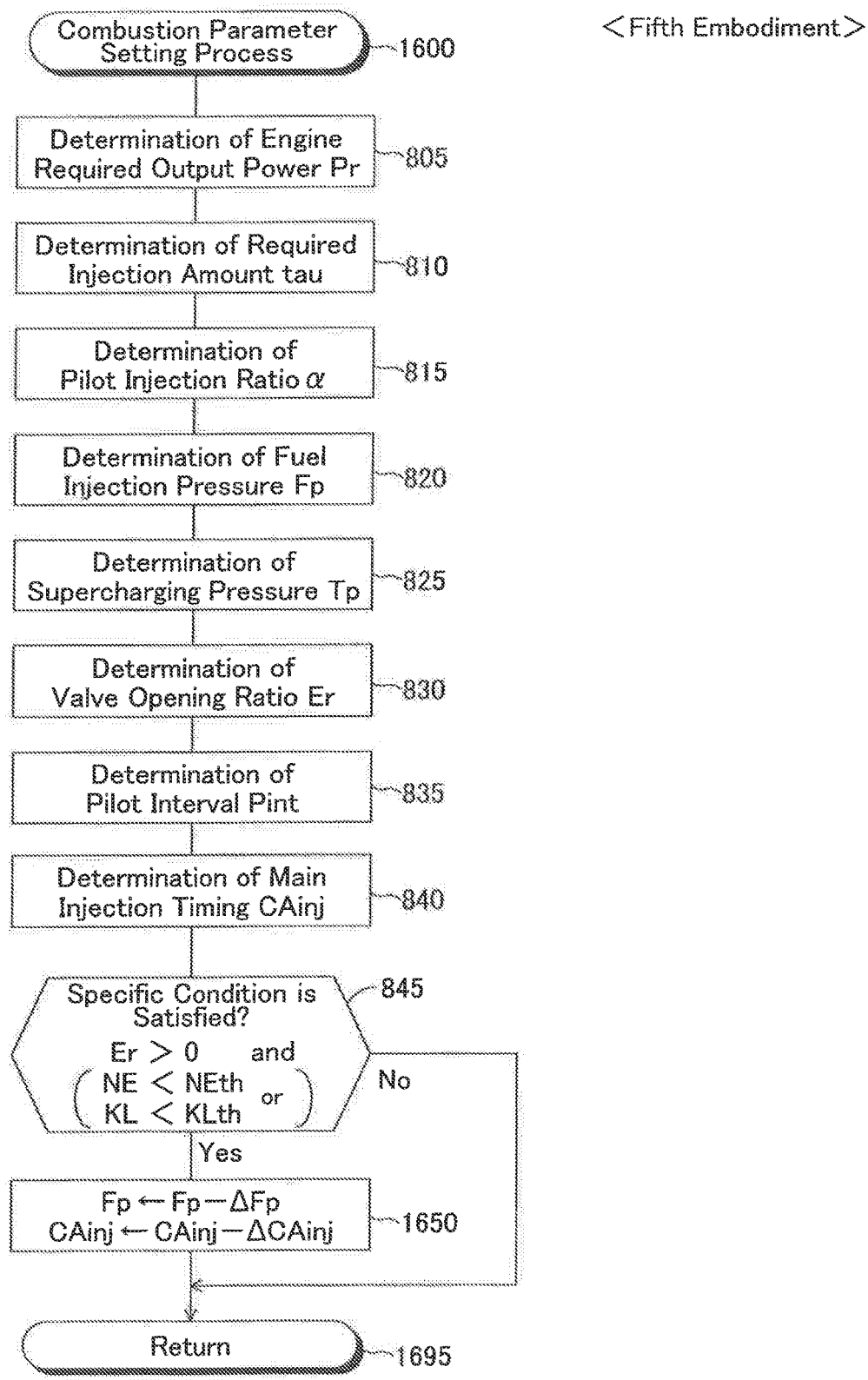
FIG. 16 is a flowchart showing a combustion parameter setting process which the fifth apparatus executes.
Figure 19:
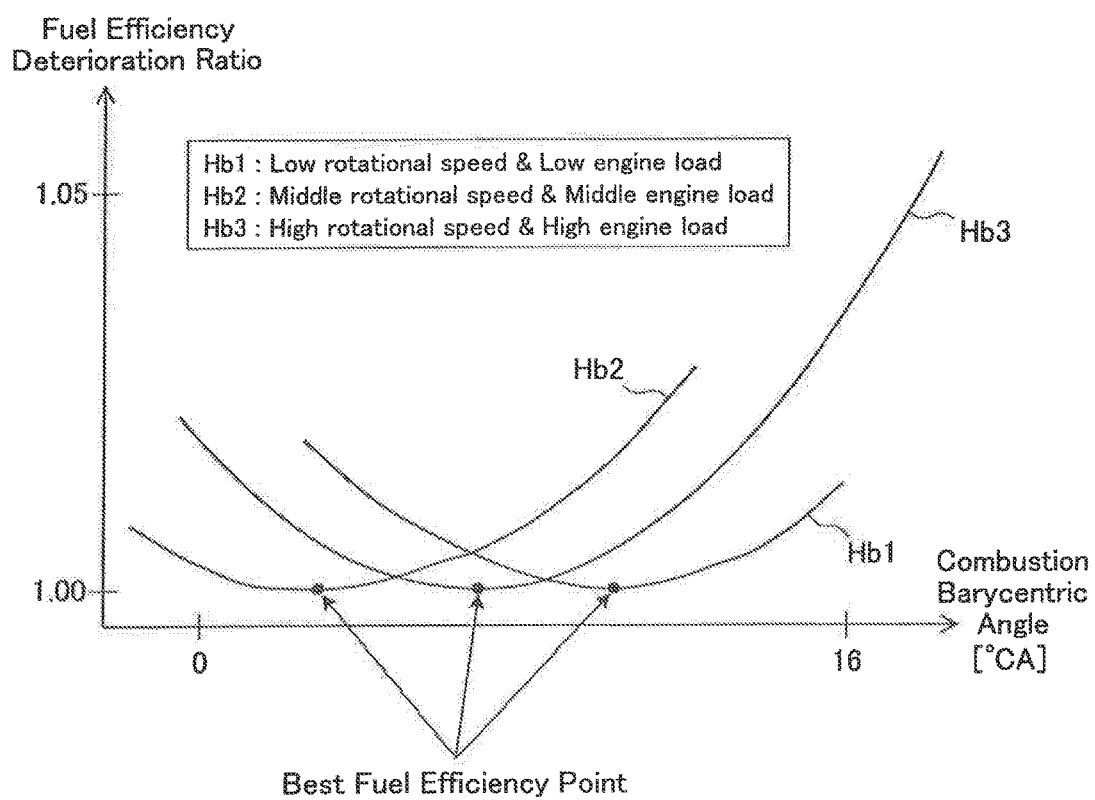
FIG. 19 is a graph showing relationships between the Combustion Barycentric Angle and the fuel efficiency deterioration ratio for various combinations of an engine load and an engine rotational speed.

Next, a combustion parameter setting process which the CPU 75 of the ECU 74 (hereinafter, simply referred to as a "CPU") executes will be described with reference to the flowchart shown in FIG. 16. Each step shown in FIG. 16 at which the same processing is performed as each step shown in FIG. 8 is given the same step symbol as one given to such step shown in FIG. 8. The CPU starts processing every elapse of a predetermined time from step 1600, executes processes of steps from step 805 to step 840, and proceeds to step 845.

When the CPU makes a "Yes" determination at step 845 (that is, the specific condition is satisfied), it proceeds to step 1650. In this case, there is a possibility (it is likely) that the increase in the combustion noise occurs.

At step 1650, the CPU sets the fuel injection pressure Fp to/at a value which is lower than the fuel injection pressure Fp set at step 820 by ΔFp. As a result, the fuel injection pressure Fp becomes lower by ΔFp. In addition, the CPU sets the main fuel injection timing CAinj to/at a value which is smaller than the main fuel injection timing CAinj set at step 840 by ΔCAinj. As a result, the main fuel injection timing CAinj is advanced by ΔCAinj. Subsequently, the CPU proceeds to step 1695 to end the present routine tentatively. As a result, the specific control is executed.

These correction values, ΔFp and ΔCAinj, are determined in advance according to experiments or the like such that the Heat Release Rate Barycentric Position Gc becomes equal to (coincides with) the Target Barycentric Position Gc* when the combustion in the cylinder 22 is controlled using "the corrected fuel injection pressure Fp and the corrected main fuel injection timing CAinj." The correction values, ΔFp and ΔCAinj, are stored in the ROM 76 in a form of a map.

On the other hand, when the CPU makes a "No" determination at step 845 (that is, the specific condition is not satisfied), it directly proceeds to 1695. As a result, the Barycentric Position Control is executed.

As described above, according to the fifth apparatus, the combustion noise can be suppressed while the Heat Release Rate Barycentric Position Gc is maintained at the Target Barycentric Position Gc*.

The embodiments of the engine control apparatuses for an internal combustion engine according to the present invention are described above, but the present invention is not limited to the embodiments described above, and various modifications are possible without departing from the objects of the present invention. For example, the present invention includes an engine control apparatuses for an internal combustion engine which is mounted on a hybrid vehicle equipped with the internal engine and an electric motor, as well as a vehicle equipped with the internal combustion engine only for driving.

Moreover, each of the ECUs according to each of the embodiments determines whether or not it executes the Noise Increasing Prevention Control based on the valve opening ratio Er, the rotational speed NE, and the engine load KL. However, each of the ECUs may determine whether to execute the Noise Increasing Prevention Control based on a change amount per unit time of the in-cylinder pressure Pc measured by the in-cylinder pressure sensor 85.

In addition, each of the ECUs according to each of the embodiments determines that there is a possibility (it is likely) that the increase in the combustion noise occurs when the valve opening ratio Er is greater than "0". However, each of the ECUs may determine that there is a possibility (it is likely) that the increase in the combustion noise occurs when the valve opening ratio Er is greater than a predetermined threshold.

Further, the each of the ECUs according to each of the embodiments determines that the specific condition is satisfied when the EGR is in execution (is being executed), and "the rotational speed NE is lower than the rotational speed threshold NEth or the engine load KL is lower than the load threshold KLth". However, each of the ECUs may determine that the specific condition is satisfied when the EGR is in execution, and "the rotational speed NE is lower than the rotational speed threshold NEth and the engine load KL is lower than the load threshold KLth."

Furthermore, each of the ECUs according to each of the embodiments determines the combustion parameters, such as the main fuel injection timing CAinj and the pilot interval Pint, by referring to the map stored in the ROM 76, in order to make/have the Heat Release Rate Barycentric Position Gc become equal to (coincide with) the Target Barycentric Position Gc*. That is, each of the ECUs executes a feed-forward control. However, each of the ECUs may execute/performs a feedback control for/on the combustion parameters described above such that the actual Heat Release Rate Barycentric Position Gc calculated based on the in-cylinder pressure Pc measured by the in-cylinder pressure sensor 85 becomes equal to (coincide with) the Target Barycentric Position Gc*. Alternatively, each of the ECUs may execute both of the feed-forward control and the feedback control for/on the combustion parameters.

Each of the ECUs according to each of the embodiments executes the combustion control such that the Heat Release Rate Barycentric Position Gc becomes equal to (coincides with) the Target Barycentric Position Gc* in/for any engine load KL, however, it may execute the combustion control when the engine load KL and the rotational speed NE are in a specific range.

In addition, each of the ECUs according to each of the embodiments executes the two pilot injections and the one main injection, however, it may execute after injections and/or post injections in addition to those injections. Furthermore, the number of the pilot injections may be different from two (that is, one time, or times more than or equal to three times). Alternatively, no pilot injections may be executed.

Moreover, the engine 10 according to each of the embodiments comprises the EGR system 60 (a high-pressure EGR system) which communicates between the position of the exhaust passage (the exhaust manifold 51) upstream of the turbine 44b and the position of the intake passage (the intake manifold 41) downstream of the throttle valve 46. However, the engine 10 may also comprise a low-pressure EGR system which communicates between a position of the exhaust passage (the exhaust pipe 52) downstream of the turbine 44b and a position of the intake passage (the intake pipe 42) upstream of the compressor 44a. In addition, the engine 10 may comprise only the low-pressure EGR system, instead of the high-pressure EGR system.

The invention claimed is:

1. An engine control apparatus applied to an internal combustion engine having an EGR apparatus, said engine control apparatus comprising a control section which sets combustion parameters which control a combustion state of said engine, wherein, said control section is configured to:

execute a specific control, said specific control not being based on Barycentric Position Control, to set some of said combustion parameters to values which are different from certain values respectively set in a case where Barycentric Position Control is in execution for said combustion parameters such that a maximum value of an increasing amount per unit time of an in-cylinder pressure is lower than a maximum value of an increasing amount per unit time of an in-cylinder pressure in a case where said Barycentric Position Control is in execution and then said Heat Release Rate Barycentric Position becomes different from said constant reference crank angle, when an EGR is in execution, and, a load of said engine is lower than a predetermined load threshold or a rotational speed of said engine is lower than a predetermined rotational speed threshold.

2. The engine control apparatus according to claim 1, wherein, said engine comprises a supercharger, and, said control section is configured to execute, as said specific control, a control to increase a supercharging pressure serving as one of said combustion parameters.

3. The engine control apparatus according to claim 1, wherein, said control section is configured to execute, as said specific control, a control to extend a time from a pilot injection executed immediately before a main injection to said main injection.

4. The engine control apparatus according to claim 3, wherein, said control section is configured to execute, as said specific control, at least one of:

a control to advance an injection timing of said pilot injection serving as one of said combustion parameters; and, a control to retard an injection timing of said main injection serving as one of said combustion parameters.

5. The engine control apparatus according to claim 1, wherein,
said control section is configured to execute, as said specific control, a control to retard an injection timing of a main injection serving as one of said combustion parameters.

6. The engine control apparatus according to claim 1, wherein,
said control section is configured to execute, as the specific control, a control to decrease an injection pressure of a fuel serving as one of said combustion parameters.

* * * * *